(12) United States Patent
Ng et al.

(10) Patent No.: US 10,596,763 B2
(45) Date of Patent: Mar. 24, 2020

(54) ADDITIVE MANUFACTURING WITH ARRAY OF ENERGY SOURCES

(71) Applicant: Applied Materials, Inc., Santa Clara, CA (US)

(72) Inventors: Hou T. Ng, Campbell, CA (US); Nag B. Patibandla, Pleasanton, CA (US); Sivapackia Ganapathiappan, Los Altos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 15/809,965

(22) Filed: Nov. 10, 2017

(65) Prior Publication Data

US 2018/0304538 A1    Oct. 25, 2018

Related U.S. Application Data

(60) Provisional application No. 62/488,408, filed on Apr. 21, 2017.

(51) Int. Cl.
*B29C 64/393*    (2017.01)
*B29C 64/227*    (2017.01)
(Continued)

(52) U.S. Cl.
CPC .......... *B29C 64/393* (2017.08); *B29C 64/209* (2017.08); *B29C 64/227* (2017.08);
(Continued)

(58) Field of Classification Search
CPC ............................ B29C 64/393; B29C 64/245
See application file for complete search history.

(56) References Cited

U.S. PATENT DOCUMENTS 3,741,116 A    6/1973 Green et al.
4,575,330 A    3/1986 Hull et al.
(Continued)

FOREIGN PATENT DOCUMENTS

CN    101199994    6/2008
CN    103921444    7/2014
(Continued)

OTHER PUBLICATIONS

'Wikipedia' [online]. "3D priting," 2013, [retrieved on Feb. 25, 2013]. Retrieved from the Internet: URL:http://en.wikipedia.org/wiki/3D_printing 17 pages.
(Continued)

*Primary Examiner* — Jacob T Minskey
*Assistant Examiner* — Melody Tsui
(74) *Attorney, Agent, or Firm* — Fish & Richardson P.C.

(57) ABSTRACT

An additive manufacturing apparatus includes a platform, a first support, a first actuator to create relative motion along a first axis such that the first support scans across the platform, one or more printheads supported on the first support above the platform and configured to dispense successive layers of feed material to form a polishing pad, a second support, a second actuator to create relative motion along a second axis substantially perpendicular to the first axis such that the second support scans across the platform in a direction perpendicular to the first axis, and a plurality of individually addressable energy sources supported on the second support above the platform, and a controller. The energy sources are arranged in an array that extends at least along the first axis and configured to emit radiation toward the platform.

11 Claims, 11 Drawing Sheets

(51) Int. Cl.
  *B29C 64/209* (2017.01)
  *B29C 64/277* (2017.01)
  *B29C 64/245* (2017.01)
  *B33Y 50/02* (2015.01)
  *B33Y 30/00* (2015.01)
  *B29C 64/236* (2017.01)

(52) U.S. Cl.
  CPC .......... *B29C 64/245* (2017.08); *B29C 64/277* (2017.08); *B29C 64/236* (2017.08); *B33Y 30/00* (2014.12); *B33Y 50/02* (2014.12)

(56) References Cited

U.S. PATENT DOCUMENTS

| | | |
|---|---|---|
| 4,844,144 A | 7/1989 | Murphy et al. |
| 4,942,001 A | 7/1990 | Murphy et al. |
| 5,096,530 A | 3/1992 | Cohen |
| 5,120,476 A | 6/1992 | Scholz et al. |
| 5,121,329 A | 6/1992 | Crump |
| 5,212,910 A | 5/1993 | Breivogel et al. |
| 5,257,478 A | 11/1993 | Hyde et al. |
| 5,387,380 A | 2/1995 | Cima et al. |
| 5,605,760 A | 2/1997 | Roberts |
| 5,626,919 A | 5/1997 | Chapman et al. |
| 5,738,574 A | 4/1998 | Tolles et al. |
| 5,900,164 A | 5/1999 | Budinger et al. |
| 5,906,863 A | 5/1999 | Lombardi et al. |
| 5,921,855 A | 7/1999 | Osterheld et al. |
| 5,932,290 A | 8/1999 | Lombardi et al. |
| 5,940,674 A | 8/1999 | Sachs et al. |
| 5,984,769 A | 11/1999 | Bennett et al. |
| 6,029,096 A | 2/2000 | Manners et al. |
| 6,036,579 A | 3/2000 | Cook et al. |
| 6,095,902 A | 8/2000 | Reinhardt |
| 6,122,564 A | 9/2000 | Koch et al. |
| 6,204,875 B1 | 3/2001 | De Loor et al. |
| 6,210,254 B1 | 4/2001 | Cook et al. |
| 6,241,596 B1 | 6/2001 | Osterheld et al. |
| 6,273,806 B1 | 8/2001 | Bennett et al. |
| 6,328,634 B1 | 12/2001 | Shen et al. |
| 6,423,255 B1 | 7/2002 | Hoechsmann et al. |
| 6,454,634 B1 | 9/2002 | James et al. |
| 6,488,570 B1 | 12/2002 | James et al. |
| 6,500,053 B2 | 12/2002 | James et al. |
| 6,520,847 B2 | 2/2003 | Osterheld et al. |
| 6,569,373 B2 | 5/2003 | Napadensky |
| 6,582,283 B2 | 6/2003 | James et al. |
| 6,641,471 B1 | 11/2003 | Pinheiro et al. |
| 6,645,061 B1 | 11/2003 | Bennett et al. |
| 6,682,402 B1 | 1/2004 | Roberts et al. |
| 6,699,115 B2 | 3/2004 | Osterheld et al. |
| 6,736,709 B1 | 5/2004 | James et al. |
| 6,749,485 B1 | 6/2004 | James et al. |
| 6,811,937 B2 | 11/2004 | Lawton |
| 6,860,793 B2 | 3/2005 | Budinger et al. |
| 6,860,802 B1 | 3/2005 | Vishwanathan et al. |
| 6,869,350 B2 | 3/2005 | Roberts et al. |
| 6,875,097 B2 | 4/2005 | Grunwald |
| 6,955,588 B1 | 10/2005 | Anderson et al. |
| 6,984,163 B2 | 1/2006 | Roberts |
| 7,169,030 B1 | 1/2007 | Kulp |
| 7,252,871 B2 | 8/2007 | Crkvenac et al. |
| 7,300,619 B2 | 11/2007 | Napadensky et al. |
| 7,371,160 B1 | 5/2008 | Cruz et al. |
| 7,377,840 B2 | 5/2008 | Deopura et al. |
| 7,425,172 B2 | 9/2008 | Misra et al. |
| 7,438,636 B2 | 10/2008 | Kulp et al. |
| 7,445,847 B2 | 11/2008 | Kulp |
| 7,455,571 B1 | 11/2008 | Kuo et al. |
| 7,467,025 B2 | 12/2008 | Silverbrook |
| 7,517,488 B2 | 4/2009 | Saikin |
| 7,530,880 B2 | 5/2009 | Bajaj et al. |
| 7,531,117 B2 | 5/2009 | Ederer et al. |
| 7,537,446 B2 | 5/2009 | James et al. |
| 7,556,329 B2 | 7/2009 | Silverbrook |
| 7,704,122 B2 | 4/2010 | Misra et al. |
| 7,704,125 B2 | 4/2010 | Roy et al. |
| 7,815,778 B2 | 10/2010 | Bajaj |
| 7,846,008 B2 | 12/2010 | Bajaj |
| 8,066,555 B2 | 11/2011 | Bajaj |
| 8,075,745 B2 | 12/2011 | Bajaj |
| 8,118,641 B2 | 2/2012 | Kulp et al. |
| 8,142,869 B2 | 3/2012 | Kobayashi et al. |
| 8,177,603 B2 | 5/2012 | Bajaj |
| 8,257,545 B2 | 9/2012 | Loyack et al. |
| 8,260,447 B2 | 9/2012 | Mattes et al. |
| 8,287,793 B2 | 10/2012 | Deopura et al. |
| 8,288,448 B2 | 10/2012 | Kulp |
| 8,292,692 B2 | 10/2012 | Bajaj |
| 8,380,339 B2 | 2/2013 | Misra et al. |
| 8,454,345 B2 | 6/2013 | Silverbrook |
| 8,546,717 B2 | 10/2013 | Stecker |
| 8,598,523 B2 | 12/2013 | Stecker et al. |
| 8,702,479 B2 | 4/2014 | Huang et al. |
| 8,709,114 B2 | 4/2014 | Cantrell et al. |
| 8,715,035 B2 | 5/2014 | Roy et al. |
| 8,784,721 B2 | 7/2014 | Philippi et al. |
| 8,821,214 B2 | 9/2014 | Joseph |
| 8,864,859 B2 | 10/2014 | Roy et al. |
| 8,883,392 B2 | 11/2014 | Napadensky et al. |
| 8,888,480 B2 | 11/2014 | Yoo et al. |
| 8,932,116 B2 | 1/2015 | Deopura et al. |
| 8,986,585 B2 | 3/2015 | Cantrell et al. |
| 9,017,140 B2 | 4/2015 | Allison et al. |
| 9,067,297 B2 | 6/2015 | Allison et al. |
| 9,067,299 B2 | 6/2015 | Bajaj et al. |
| 9,156,124 B2 | 10/2015 | Allison et al. |
| 9,162,340 B2 | 10/2015 | Joseph et al. |
| 9,259,820 B2 | 2/2016 | Qian et al. |
| 9,259,821 B2 | 2/2016 | Qian et al. |
| 9,278,424 B2 | 3/2016 | Roy et al. |
| 9,296,085 B2 | 3/2016 | Bajaj et al. |
| 9,314,897 B2 | 4/2016 | Qian et al. |
| 9,333,620 B2 | 5/2016 | Qian et al. |
| 9,421,666 B2 | 8/2016 | Krishnan |
| 9,457,520 B2 | 10/2016 | Bajaj |
| 9,744,724 B2 | 8/2017 | Bajaj |
| 10,029,405 B2 | 7/2018 | Bajaj et al. |
| 2001/0008830 A1 | 7/2001 | Tolles et al. |
| 2001/0020448 A1 | 9/2001 | Vaartstra et al. |
| 2001/0046834 A1 | 11/2001 | Ramana et al. |
| 2002/0111707 A1 | 8/2002 | Li |
| 2002/0112632 A1 | 8/2002 | Faibish |
| 2002/0173248 A1 | 11/2002 | Doan et al. |
| 2003/0019570 A1 | 1/2003 | Chen et al. |
| 2003/0056870 A1 | 3/2003 | Comb et al. |
| 2004/0106367 A1 | 6/2004 | Walker et al. |
| 2004/0133298 A1 | 7/2004 | Toyserkani et al. |
| 2004/0154533 A1 | 8/2004 | Agarwal et al. |
| 2004/0173946 A1 | 9/2004 | Pfeifer et al. |
| 2004/0187714 A1 | 9/2004 | Napadensky et al. |
| 2005/0000020 A1 | 1/2005 | Vishwanathan et al. |
| 2005/0012247 A1 | 1/2005 | Kramer |
| 2005/0020082 A1 | 1/2005 | Vishwanathan et al. |
| 2005/0049739 A1 | 3/2005 | Kramer |
| 2005/0110853 A1 | 5/2005 | Gardner et al. |
| 2005/0017012 A1 | 8/2005 | Kulp |
| 2005/0171224 A1 | 8/2005 | Kulp |
| 2005/0278056 A1 | 12/2005 | Farnworth et al. |
| 2006/0019587 A1 | 1/2006 | Deopura et al. |
| 2006/0099287 A1 | 5/2006 | Kim |
| 2006/0111807 A1 | 5/2006 | Gothait |
| 2006/0160478 A1 | 7/2006 | Donohue et al. |
| 2006/0192315 A1 | 8/2006 | Farr et al. |
| 2007/0054599 A1 | 3/2007 | Taylor et al. |
| 2007/0128991 A1 | 6/2007 | Yoon et al. |
| 2007/0182782 A1 | 8/2007 | Silverbrook |
| 2007/0212979 A1 | 9/2007 | Preston |
| 2007/0235904 A1 | 10/2007 | Saikin |
| 2008/0009228 A1 | 1/2008 | Nagase et al. |
| 2008/0157436 A1 | 7/2008 | Patel et al. |
| 2008/0207100 A1 | 8/2008 | Roy et al. |
| 2008/0211141 A1 | 9/2008 | Deopura et al. |
| 2008/0314878 A1 | 12/2008 | Cai et al. |

(56) References Cited

U.S. PATENT DOCUMENTS

| | | |
|---|---|---|
| 2009/0000539 A1 | 2/2009 | Roy et al. |
| 2009/0053976 A1 | 2/2009 | Roy et al. |
| 2009/0105363 A1 | 4/2009 | Napadensky |
| 2009/0206065 A1 | 8/2009 | Kruth et al. |
| 2009/0311955 A1 | 12/2009 | Kerprich et al. |
| 2009/0321979 A1 | 12/2009 | Hiraide |
| 2010/0191360 A1 | 7/2010 | Napadensky |
| 2010/0323050 A1 | 12/2010 | Kumagai et al. |
| 2011/0059247 A1 | 3/2011 | Kuzusako et al. |
| 2011/0077321 A1 | 3/2011 | Napadensky |
| 2011/0180952 A1 | 7/2011 | Napadensky |
| 2012/0178845 A1 | 7/2012 | Napadensky et al. |
| 2012/0302148 A1 | 11/2012 | Bajaj et al. |
| 2012/0315830 A1 | 12/2012 | Joseph et al. |
| 2013/0019570 A1 | 1/2013 | Weible |
| 2013/0055568 A1 | 3/2013 | Dusel et al. |
| 2013/0059509 A1 | 3/2013 | Deopura et al. |
| 2013/0172509 A1 | 7/2013 | Pawloski et al. |
| 2013/0231032 A1 | 9/2013 | Swedek et al. |
| 2013/0283700 A1 | 10/2013 | Bajaj et al. |
| 2013/0309951 A1 | 11/2013 | Benvegnu et al. |
| 2013/0316081 A1 | 11/2013 | Kovalcik et al. |
| 2013/0328228 A1 | 12/2013 | Pettis et al. |
| 2014/0048970 A1 | 2/2014 | Batchelder et al. |
| 2014/0117575 A1 | 5/2014 | Kemperle et al. |
| 2014/0163717 A1 | 6/2014 | Das et al. |
| 2014/0206268 A1 | 7/2014 | Lefevre et al. |
| 2014/0239527 A1 | 8/2014 | Lee |
| 2014/0271328 A1 | 9/2014 | Burris et al. |
| 2014/0324206 A1 | 10/2014 | Napadensky |
| 2015/0024233 A1 | 1/2015 | Gunther |
| 2015/0037601 A1 | 2/2015 | Blackmore |
| 2015/0038066 A1 | 2/2015 | Huang et al. |
| 2015/0045928 A1 | 2/2015 | Perez et al. |
| 2015/0056421 A1 | 2/2015 | Yudovin-Father et al. |
| 2015/0061170 A1 | 3/2015 | Engel et al. |
| 2015/0065020 A1 | 3/2015 | Roy et al. |
| 2015/0084238 A1 | 3/2015 | Bonassar et al. |
| 2015/0093977 A1 | 4/2015 | Deopura et al. |
| 2015/0115490 A1 | 4/2015 | Reinarz |
| 2015/0123298 A1 | 5/2015 | Napadensky |
| 2015/0126099 A1 | 5/2015 | Krishnan et al. |
| 2015/0129798 A1 | 5/2015 | Napadensky |
| 2015/0137426 A1 | 5/2015 | Van Esbroeck et al. |
| 2016/0052103 A1 | 2/2016 | Qian et al. |
| 2016/0107287 A1 | 4/2016 | Bajaj |
| 2016/0107288 A1 | 4/2016 | Orilall |
| 2016/0107290 A1 | 4/2016 | Bajaj et al. |
| 2016/0107381 A1 | 4/2016 | Krishnan et al. |
| 2016/0114458 A1 | 4/2016 | Bajaj |
| 2016/0221145 A1 | 8/2016 | Huang et al. |
| 2016/0229023 A1 | 8/2016 | Lugg et al. |
| 2016/0236279 A1 | 8/2016 | Ashton et al. |
| 2016/0279757 A1 | 9/2016 | Qian |
| 2016/0354901 A1 | 12/2016 | Krishnan |
| 2017/0008126 A1* | 1/2017 | Long ............ B22F 3/105 |
| 2017/0021455 A1 | 1/2017 | Dallarosa et al. |
| 2017/0036404 A1 | 2/2017 | Rengers et al. |
| 2017/0072643 A1 | 3/2017 | Ng et al. |
| 2017/0151648 A1 | 6/2017 | Huang |
| 2017/0203409 A1 | 7/2017 | Lefevre |
| 2017/0355140 A1 | 12/2017 | Bajaj et al. |
| 2018/0093411 A1 | 4/2018 | Ng et al. |
| 2018/0304539 A1 | 10/2018 | Ng et al. |
| 2019/0001570 A1* | 1/2019 | Branham ........... B33Y 30/00 |

FOREIGN PATENT DOCUMENTS

| | | |
|---|---|---|
| CN | 104210108 | 12/2014 |
| CN | 104385595 | 3/2015 |
| CN | 104400998 | 3/2015 |
| CN | 104607639 | 5/2015 |
| DE | 19834559 | 2/2000 |
| EP | 1512519 | 3/2005 |
| EP | 1661690 | 5/2006 |
| EP | 2025458 | 2/2009 |
| EP | 2025459 | 2/2009 |
| EP | 2277686 | 1/2011 |
| EP | 2431157 | 3/2012 |
| EP | 2463082 | 6/2012 |
| JP | H9-50974 | 2/1997 |
| JP | 09-076353 | 3/1997 |
| JP | 11-254542 | 9/1999 |
| JP | 11-347761 | 12/1999 |
| JP | 2001-507997 | 6/2001 |
| JP | 2002-28849 | 1/2002 |
| JP | 2004-243518 | 9/2004 |
| JP | 2006-95680 | 4/2006 |
| JP | 3801100 | 7/2006 |
| JP | 2007-281435 | 10/2007 |
| JP | 2008-507417 | 3/2008 |
| JP | 2008-531306 | 8/2008 |
| JP | 2009-101487 | 5/2009 |
| JP | 2011-67946 | 4/2011 |
| JP | 2015-517922 | 6/2015 |
| KR | 2003-0020658 | 3/2003 |
| KR | 10-2005-0052876 | 6/2005 |
| KR | 10-0606476 | 7/2006 |
| KR | 10-2008-0038607 | 5/2008 |
| KR | 10-2013-013884 | 12/2013 |
| KR | 10-2015-0047628 | 5/2015 |
| TW | 201234466 | 8/2012 |
| WO | WO 98/30356 | 7/1998 |
| WO | WO 2001/64396 | 9/2001 |
| WO | WO 2002/24415 | 3/2002 |
| WO | WO 2003/089702 | 10/2003 |
| WO | WO 2003/103959 | 12/2003 |
| WO | WO 2009/158665 | 12/2009 |
| WO | WO 2011/082155 | 7/2011 |
| WO | WO 2011/088057 | 7/2011 |
| WO | WO 2013/128452 | 9/2013 |
| WO | WO 2014/095200 | 6/2014 |
| WO | WO 2014/141276 | 9/2014 |
| WO | WO 2015/040433 | 3/2015 |
| WO | WO 2015/055550 | 4/2015 |
| WO | WO 2015/111366 | 7/2015 |
| WO | WO 2015/118552 | 8/2015 |
| WO | WO 2015/120168 | 8/2015 |
| WO | WO 2015/120430 | 8/2015 |
| WO | WO 2015/161210 | 10/2015 |
| WO | WO 2016/060712 | 4/2016 |
| WO | WO 2016/163716 | 10/2016 |
| WO | WO 2016/184888 | 11/2016 |

OTHER PUBLICATIONS

Cook, "CMP Consumables II: Pad," Chapter 6: Semiconductors and Semimetals, 2000, 155-181.

Desai et al., "Effect of Polishing Pad Material Properties on Chemical Mechanical Polishing (CMP) Processes," Center for Polymer Research, University of Texas, Austin, TX 78712, 1994, 8 pages.

Hermant et al., "A Comparative Study of Polyurethane-Poly(Methyl Methacrylate) Interpenetrating and Semi-1 Interprenetrating Polymer Networks," 1984, 20: 85-89.

International Search Report and Written Opinion in International Application No. PCT/US2017/053712, dated Jan. 10, 2018, 14 pages.

Krober et al., "Reactive inkjet printing of polyurethanes," Journal of Materials Chemistry, 2009, 19:5234-5238.

Plastics in Action; 3-D Printing Speeds Prototype Development dated May/Jun. 1998; 2 total pages.

Rodel, Rodel IC1000 CMP Pad, 1999, 2 pages.

Van den Berg et al., "Inkjet printing of polyurethane colloidal suspensions," Soft Matter, 2007, 3:238-243.

Yang et al., "High Viscosity Jetting System for 3D Reactive Inkjet Printing," Twenty Forth Annual International Solid Freeform Fabrication Symposium, 2013, 505-513.

* cited by examiner

ADDITIVE MANUFACTURING WITH ARRAY OF ENERGY SOURCES

CROSS-REFERENCE TO RELATED APPLICATIONS

This application claims priority to U.S. Provisional Application Ser. No. 62/488,408, filed on Apr. 21, 2017, the entire disclosure of which is incorporated by reference.

TECHNICAL FIELD

This specification relates to energy delivery systems for additive manufacturing apparatuses.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which articles are cut out from a stock material (e.g., a block of wood, plastic, composite or metal).

A variety of additive processes can be used in additive manufacturing. Some systems use an energy source to deliver energy to feed material, e.g., a powder, to sinter or melt the feed material. Once all the selected locations on the first layer are sintered or melted and then re-solidified, a new layer of feed material is deposited on top of the completed layer, and the process is repeated layer by layer until the desired article is produced. In many of these methods, the energy source is a laser that emits an energy beam to fuse powder to form an article. Some laser-based methods melt or soften material to produce layers, e.g., selective laser melting (SLM) or direct metal laser sintering (DMLS), selective laser sintering (SLS), fused deposition modeling (FDM), while others use energy beams to cure liquid materials using different technologies, e.g. stereolithography (SLA). These processes can differ in the way layers are formed to create the finished objects and in the materials that are compatible for use in the processes.

SUMMARY

In one aspect, an additive manufacturing apparatus includes a platform, a support, an actuator coupled to at least one of the platform and the support and configured to create relative motion therebetween along a first axis such that the support scans across the platform, one or more printheads supported on the support above the platform and configured to dispense successive layers of feed material to form a polishing pad, a plurality of individually addressable energy sources supported above the platform, and a controller. The energy sources are arranged in an array that extends at least along a second axis perpendicular to the first axis and are configured to emit radiation toward the platform. The controller is configured to cause the actuator to create relative motion between the support and the platform such that the one or more printheads and the energy sources scan across the platform, cause the one or more printheads to dispense a layer of feed material on the platform, and operate the energy sources to apply energy to a selected region of the layer of feed material on the platform.

Implementations may include one or more of the following features.

Each energy source may correspond to a respective voxel of a topmost layer of feed material above the platform. The array of the energy sources may extend along the first axis. The array may extend along an entire width of a build area of the platform. The array of energy sources may extend across an area above the platform corresponding to a build area for the polishing pad. The energy sources may be supported above the platform by the support.

The array of the energy sources may be a first array of first energy sources to emit radiation to cure an outer surface of the layer of feed material. The additive manufacturing apparatus may further include a second array of second energy sources to emit radiation to cure an interior of the layer of feed material, and the controller may be configured to operate the first energy sources to apply energy to the selected region and then operate the second energy sources to apply energy to the selected region. The first energy sources may be configured to emit radiation having a first wavelength, and the second energy sources may be configured to emit radiation have a second wavelength that is less than the first wavelength.

The controller may be configured to control an intensity of radiation emitted by the energy sources. The controller may be configured to determine a current to be delivered to the energy sources to control the intensity of radiation emitted by the energy sources. A photodetector may generate a signal indicative of the intensity of radiation. The controller may be configured to control the intensity of radiation based on the signal such that the intensity of radiation is within a predefined range. The energy sources may include light emitting diodes (LEDs) configured to emit radiation having an intensity dependent on a current delivered to the LEDs.

The actuator may be configured to move the platform relative to the support. The actuator is configured to move the support relative to the platform. The printhead may be movable along the second axis relative to the support.

The controller may be configured to move the support and the one or more printheads across the platform and relative to the energy source to dispense another layer of feed material on the layer of feed material, and to operate the energy sources to apply energy to another selected region of the other layer of feed material.

The controller is may be configured to operate the energy sources after the layer of feed material is dispensed. The controller may be configured to simultaneously activate the energy sources. The energy sources may be fixed relative to the support.

In another aspect, an additive manufacturing apparatus may include a platform, a support, an actuator coupled to at least one of the platform and the support and configured to create relative motion therebetween along a first axis such that the support scans across the platform, one or more printheads supported on the support above the platform and configured to dispense successive layers of feed material to form a polishing pad, an energy source supported above the platform and configured to emit radiation toward the platform, a selectively addressable mask to receive the emitted radiation, and a controller. The controller is configured to cause the actuator to create relative motion between the support and the platform such that the one or more printheads and the energy sources scan across the platform, cause the one or more printheads to dispense a layer of feed material on the platform, and operate the mask to project an image toward the platform to cure a selected region of the layer of feed material on the platform.

In another aspect, an additive manufacturing apparatus includes a platform, a first support, a first actuator coupled to at least one of the platform and the first support and configured to create relative motion therebetween along a first axis such that the first support scans across the platform, one or more printheads supported on the first support above the platform and configured to dispense successive layers of feed material to form a polishing pad, a second support, a second actuator coupled to at least one of the platform and the second support and configured to create relative motion therebetween along a second axis substantially perpendicular to the first axis such that the second support scans across the platform in a direction perpendicular to the first axis, and a plurality of individually addressable energy sources supported on the second support above the platform, and a controller. The energy sources are arranged in an array that extends at least along the first axis and configured to emit radiation toward the platform. The controller is configured to cause the first actuator and the second actuator to create relative motion between the first support and the platform and between the second support and thee platform such that the one or more printheads and the energy sources scan across the platform, cause the one or more printheads to dispense a layer of feed material on the platform, and operate the energy sources to apply energy to a selected region of the layer of feed material on the platform.

Implementations may include one or more of the following features.

The energy sources may each correspond to a voxel of a topmost layer of feed material above the platform. The array of the energy sources may extend along the second axis. The array extends along an entire length of a build area of the platform. The array of energy sources may extends across an area above the platform corresponding to a build area for the polishing pad. The second support may be mounted on the first support. The second support may be mounted to a frame separately from the first support.

The array of the energy sources may be a first array of first energy sources to emit radiation to cure an outer surface of the layer of feed material, and the additive manufacturing apparatus may further include a second array of second energy sources to emit radiation to cure an interior of the layer of feed material. The controller may be configured to operate the first energy sources to apply energy to the selected region and then operate the second energy sources to apply energy to the selected region.

The first energy sources may be configured to emit radiation having a first wavelength, and the second energy sources may be configured to emit radiation have a second wavelength, the second wavelength being less than the first wavelength. The energy sources may include light emitting diodes (LEDs) configured to emit radiation having an intensity dependent on a current delivered to the LEDs.

In another aspect, an additive manufacturing apparatus includes a platform, one or more printheads supported configured to dispense successive layers of feed material to form a polishing pad, a first support, a first actuator coupled to at least one of the platform and the first support and configured to create relative motion therebetween along a first axis such that the first support scans across the platform, a first plurality of individually addressable first energy sources supported on the first support above the platform, a second support, a second plurality of individually addressable second energy sources supported on the second support above the platform and configured to emit radiation toward the platform, and a controller. The first energy sources are arranged in an array that extends at least along a second axis perpendicular to the first axis and configured to emit radiation toward the platform. The controller is configured to cause the printheads to dispense a layer of feed material, cause the first actuator to create relative motion between the first support and the platform such that the first energy sources scan across the platform, and operate the first and second energy sources to apply energy to a selected region of the layer of feed material on the platform.

Implementations may include one or more of the following features.

The second plurality of second energy sources may be arranged in an array that extends at least along the first axis. A second actuator may be coupled to at least one of the platform and the second support and may be configured to create relative motion therebetween along a second axis substantially perpendicular to the first axis such that the second support scans across the platform in a direction perpendicular to the first axis. The second support may be mounted on the first support. The second support may be mounted to a frame separately from the first support.

The second plurality of second energy sources may be arranged in an array that extends at least along the second axis. A second actuator may be coupled to at least one of the platform and the second support and may be configured to create relative motion therebetween along the first axis such that the second support scans across the platform in a direction parallel to the first axis.

The second support is stationary relative to platform. The second plurality of individually addressable second energy sources may be a two-dimensional array extending along both the first axis and the second axis. The two-dimensional array may extend along an entire width and length of a build area of the platform.

Advantages of the foregoing may include, but are not limited to, the following. A duration of energy exposure can be controlled at each voxel and decupled form movement of a gantry. The energy sources form an array that enables the energy sources to emit radiation toward a larger portion of the dispensed feed material, thereby enabling the dispensed feed material to be cured more quickly while still maintaining control over curing of individual voxels.

Furthermore, the array of energy sources can extend in a direction perpendicular to relative motion between the array and the platform supporting the dispensed material such that relative motion between the array and the platform in the perpendicular direction is not necessary for curing the dispensed feed material. The energy sources can selectively expose a layer of dispensed feed material in a single pass, and can thus increase throughput of articles to be formed by the additive manufacturing apparatus. Alternatively, if the array of energy sources does not extend in the direction perpendicular to the relative motion between the array and the platform, less motion of the energy sources in the perpendicular direction is required to expose an entire width of the layer of dispensed feed material.

Although the array of the energy sources can emit radiation toward larger portions of the dispensed feed material, each individual energy source can precisely apply energy to a single voxel. Thus, each individual energy source can apply energy to a small number of drops of feed material, e.g., one, two, three, four drops of feed material. The feed material can thus be cured more consistently, thereby improving the resolution of the article and decreasing the likelihood of distortions caused by a single energy source that applies energy in bulk to the feed material. Furthermore, by being formed from individually controllable energy sources, each energy source of the array of the energy sources can be independently controlled to form complex geometry of an article.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
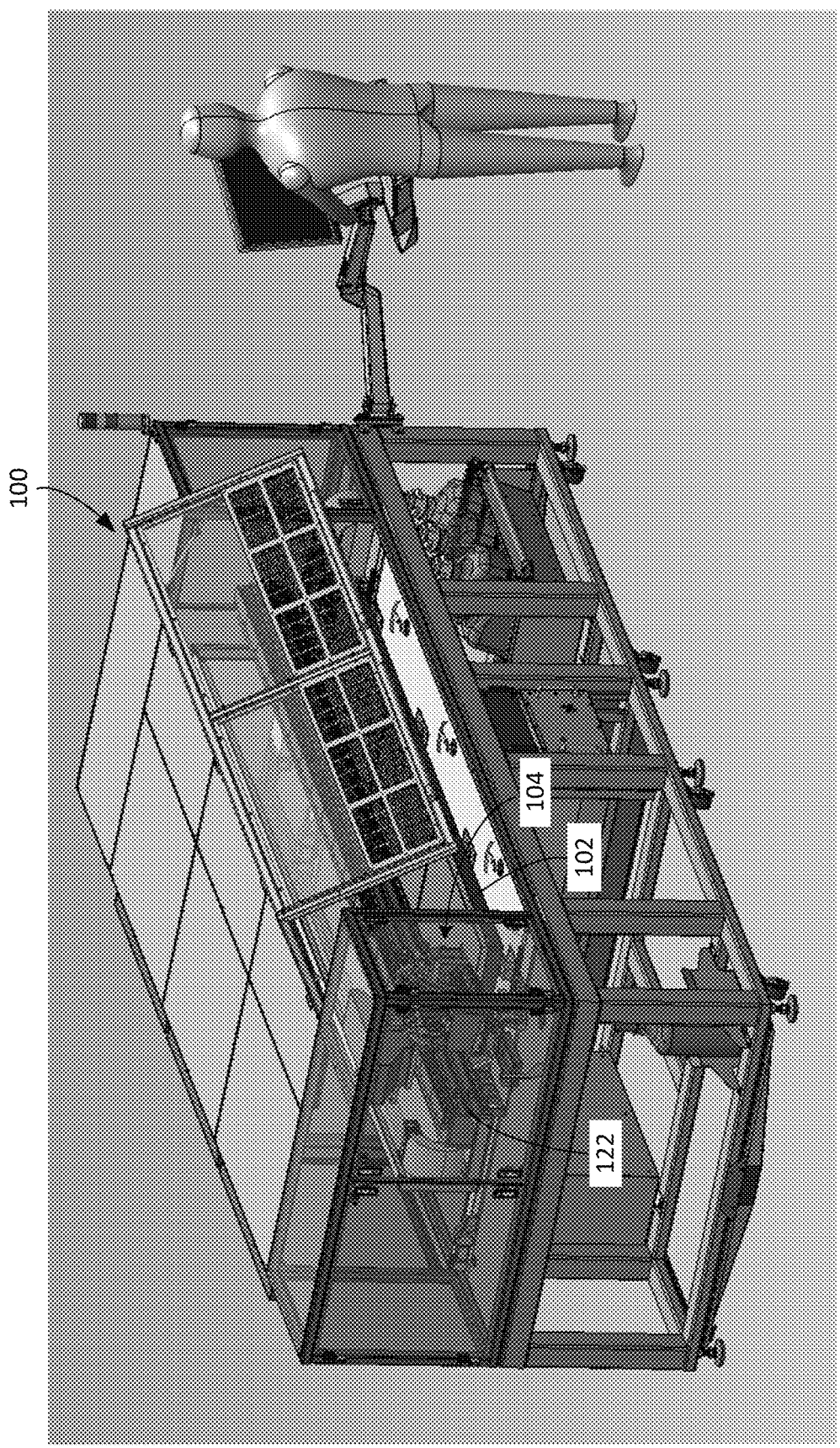
FIG. 1 is a schematic perspective view of an additive manufacturing apparatus.

In additive manufacturing apparatuses that include an energy delivery system with a single energy source, the single energy source can be moved in multiple horizontal directions to cure different portions of the dispensed feed material. In particular, the energy source is movable across an entire width and an entire length of the build area at which the feed material is dispensed so that curing can be controlled across the entire build area. However, this movement can result in small throughput and slower process of fabricating the article.

Multiple energy sources that can each cure a different portion of the dispensed feed material, e.g., an array of the energy sources, can facilitate quicker selective curing of the feed material dispensed on the platform by decreasing the amount of motion of the energy delivery system required to cure feed material across the entire build area, e.g., relative to single energy source energy delivery systems. The array can extending along an axis perpendicular to an axis along which relative motion of the energy sources and the platform occurs.

Such an additive manufacturing apparatus can dispense feed materials on a platform to form an article, e.g., a polishing pad, having tight tolerances, e.g., good thickness uniformity.

Articles formed by the additive manufacturing apparatuses described herein can include, for example, a polishing pad used for planarization of a substrate of an integrated circuit. An integrated circuit is typically formed on a substrate by the sequential deposition of conductive, semiconductive, or insulative layers on a silicon wafer. A variety of fabrication processes require planarization of a layer on the substrate. For certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one accepted method of planarization. This planarization method typically requires that the substrate be mounted on a carrier head. The exposed surface of the substrate is typically placed against a rotating polishing pad. The carrier head provides a controllable load on the substrate to push it against the polishing pad. A polishing liquid, such as slurry with abrasive particles, is typically supplied to the surface of the polishing pad.

One objective of a chemical mechanical polishing process is polishing uniformity. If different areas on the substrate are polished at different rates, then it is possible for some areas of the substrate to have too much material removed ("overpolishing") or too little material removed ("underpolishing"). In addition to planarization, polishing pads can be used for finishing operations such as buffing.

Some polishing pads include "standard" pads and fixed-abrasive pads. A standard pad has a polyurethane polishing layer with a durable roughened surface, and can also include a compressible backing layer. In contrast, a fixed-abrasive pad has abrasive particles held in a containment media, and can be supported on a generally incompressible backing layer.

Polishing pads are typically made by molding, casting or sintering polyurethane materials. In the case of molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process.

Figure 2:
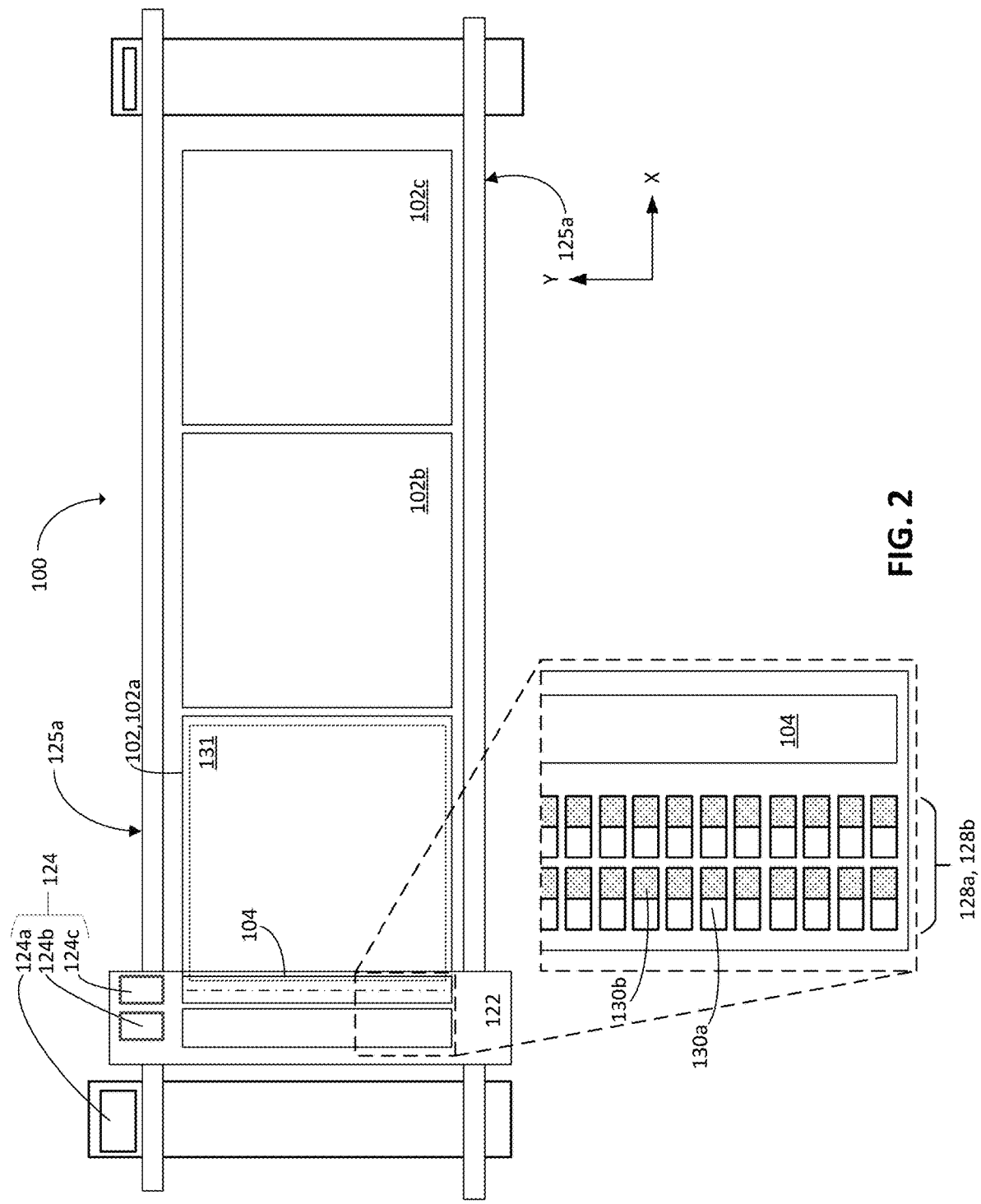
FIG. 2 is a schematic top view of an additive manufacturing apparatus.
Figure 3:
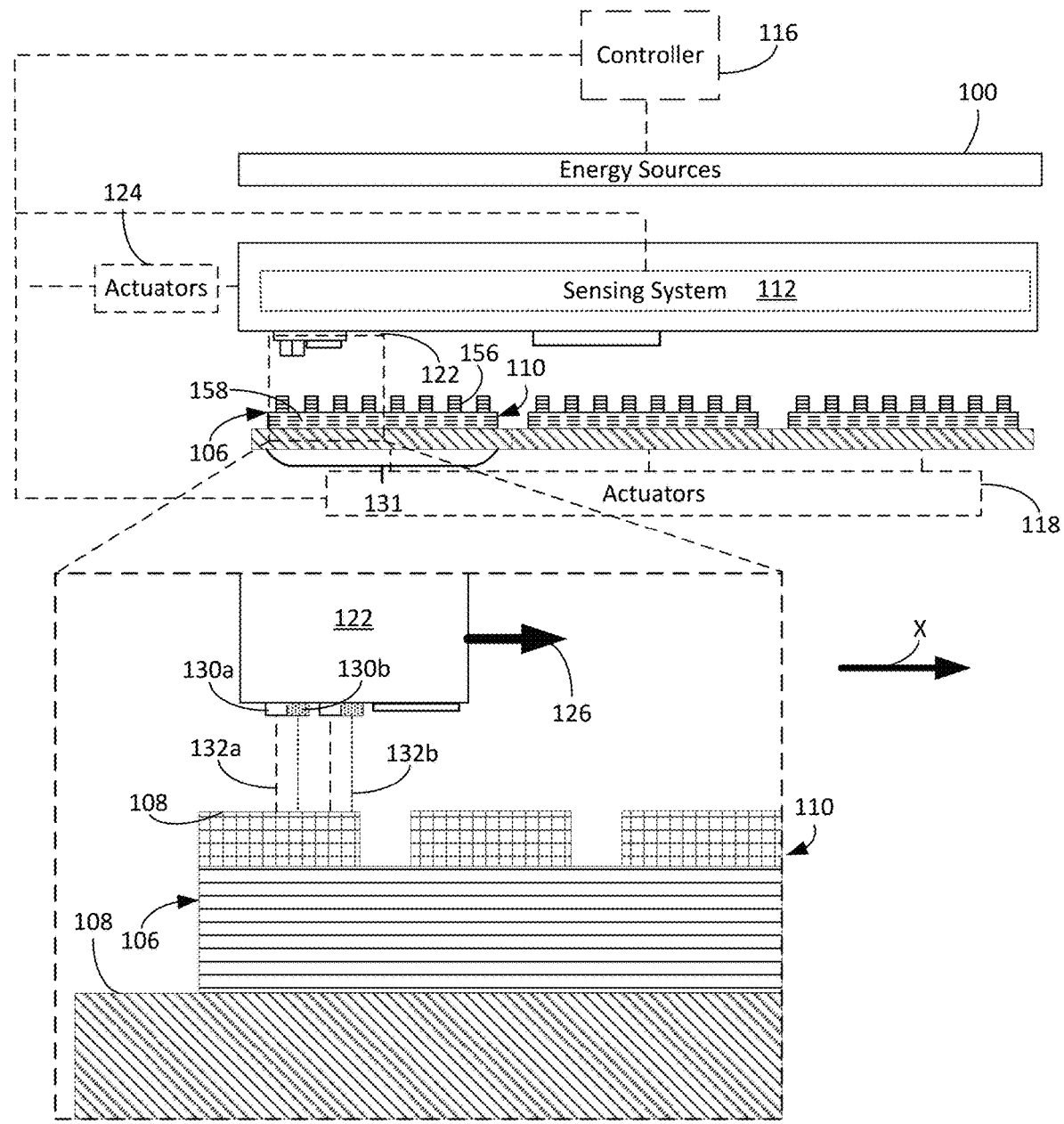
FIG. 3 is a schematic side view of an additive manufacturing apparatus including a schematic block diagram of a control system for the additive manufacturing apparatus.
Figure 4A:
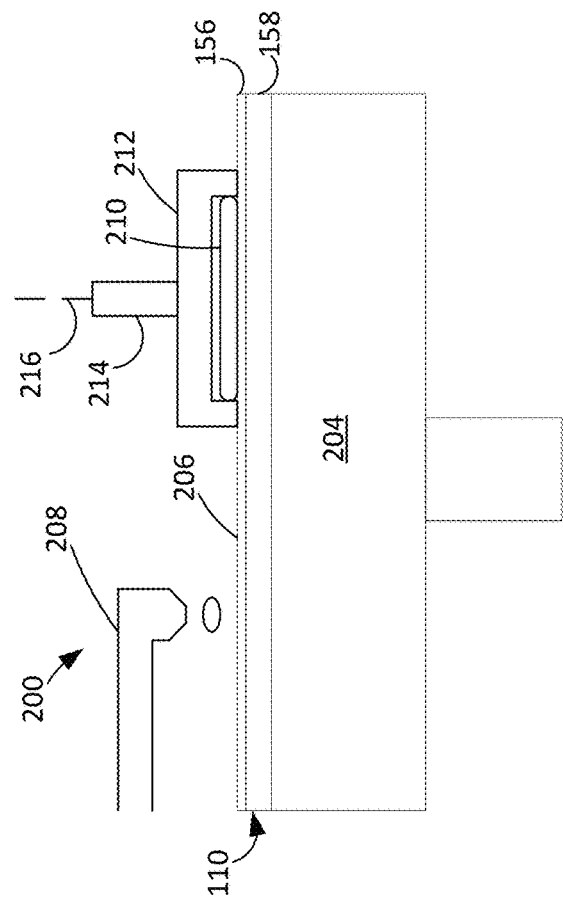
FIG. 4A is a schematic side view of a polishing station.
Figure 4B:
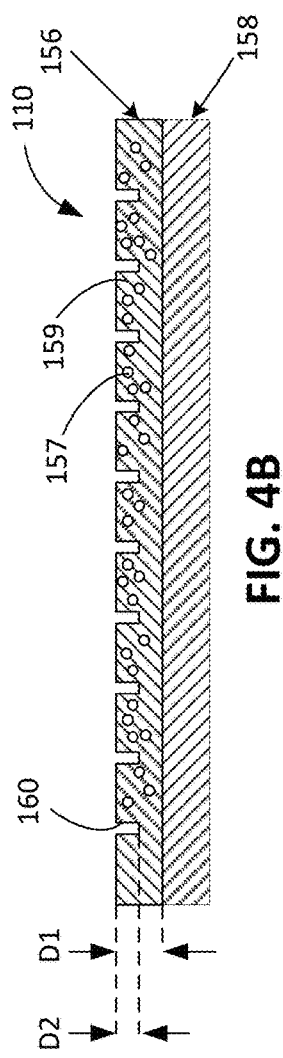
FIG. 4B is a schematic side view of a polishing pad.

Referring to the examples depicted in FIGS. 1-3, an additive manufacturing apparatus 100 for forming articles, e.g., polishing pads, includes at least one platform 102 and a printhead system supported above the platform 102. A support 122 suspends the printhead system 104 above the platform 102. For example, as shown in FIG. 3, the printhead system 104 supported above the platform 102 dispenses successive layers of feed material 106 on a top surface 108 of the platform 102. During a manufacturing operation, the layers of feed material 106 are formed into a polishing pad 110, as shown in FIGS. 4A and 4B.

As shown in FIG. 2, in some implementations, the apparatus 100 includes multiple platforms 102a-102c, e.g., three platforms, arranged in a linear array. However, the apparatus 100 could include more than three platforms, and the platforms could be arranged in a two-dimensional array (e.g., a rectangular array) rather than a linear array. In some implementations, the apparatus 100 is configured to produce multiple articles in the scanning direction 126 of the printhead system 104. Each of the platforms 102a-102c can support one or more articles to be formed. The apparatus 100 includes, for example, the platforms 102a, 102b, 102c to support one corresponding article. Alternatively, a single platform 102 is sized to carry multiple articles, e.g., two or more polishing pads, along the X-axis. Furthermore, in some implementations, rather than having three distinct platforms 102a-102c, the apparatus 100 includes a single platform to carry multiple articles.

Referring to FIG. 2, the printhead system 104 includes one or more printheads that together span the build area of the platform 102. For example, a plurality of printheads can be arranged in two or more columns to form a staggered array. In this case, the support 122 to which the printhead system 104 is mounted can be horizontally movable by an actuator system 124 in only the scanning direction, i.e., along the X-axis but not the Y-axis, so that the printhead system 104 can dispense the feed material 106 in any portion of the build area. The support 122 includes, for example, a gantry suspended on supports, e.g., two rails 125a, that are arranged on opposite sides of the platform 102.

In some implementations, if the printheads of the printhead system 104 do not extend along an entire width of the platform 102, the printhead system 104 is movable along the Y-axis relative to the platform 102. The printhead system 104 can be movably mounted to the support 122 so that the printheads can be repositioned to dispense feed material across the entire width of the platform 102. The printhead system 104 can be moved to desired locations above the platform 102. In some implementations, a linear actuator 124c of the actuator system 124 is positioned on the support 122. The linear actuator 124c is operable to move the array 128a of the printhead system 104 along the Y-axis relative to the support 122 and relative to the platform 102.

The article is, for example, a polishing pad 110. The layers of feed material 106 are formed into the polishing pad 110, for example, through a curing operation. Each layer can be cured before the next layer is dispensed. Referring to FIGS. 2 and 3, the apparatus 100 includes an energy delivery system including energy sources 130a supported above the platform 102. In some implementations, the energy sources 130a are fixed to the support 122. As shown in FIG. 2, the energy sources 130a form an array 128a. The energy sources 130a are operated to emit radiation toward the dispensed feed material 106 to cure selective portions of the feed material 106, thereby forming portions of the polishing pad 110.

The actuator system 124 is operable to create relative motion between the support 122 and the platform 102, e.g., along the X-axis as shown in FIG. 2. Movement along the X-axis corresponds to a scanning direction of the printhead system 104 and the energy sources 130a. The support 122 and the platform 102 can be configured to be immobile relative to each other along the Y-axis. Alternatively, the actuator system 124 can be configured to create relative motion between the support 122 and the platform 102 along the Y-axis.

In some implementations, the support 122 is movable in a scanning direction 126 that is along the direction of the linear array of the platforms 102a-102c, e.g., the X-axis as shown in FIG. 2. The actuator system 124 is operable to move the support 122 horizontally in the scanning direction 126. For example, the support 122 can be coupled to a rail 125a that extends along the X-axis, and a linear actuator 124a that is part of the actuator system 124 can drive the support along the rail 125a.

In some implementations, the platform 102 is positioned on a conveyor operable to move the platforms along the X-axis. The actuator system 124 includes an actuator to generate linear motion of the conveyor along the X-axis, thereby causing relative motion of the platforms 102 and the support 122. Unidirectional motion of the support 122 or the platform 102 along the X-axis can increase the speed of at which feed material 106 is dispensed and cured.

In some implementations, as shown in FIG. 3, the apparatus 100 includes a sensing system 112 to detect a height of the platform 102 and/or the height of the top surface of the layers of feed material 106. The sensing system 112 can include one or more optical sensors that measure a height of a topmost layer of feed material 106 relative to the support 122. The apparatus 100 includes a controller 116 operably connected to the different systems of the apparatus 100 to control operations of the different systems.

The controller 116 is configured to selectively operate the actuator system 124 to create relative vertical motion between the support 122 and the platform 102. For example, after each layer is dispensed, the actuator system 124 could be used to lift the printhead system 104 by a height equal to the thickness of a deposited layer of feed material. In some cases, the actuator system 124 includes a first actuator to move the support 122 vertically and a second actuator to move the support 122 horizontally. During curing and/or dispensing, motion of the support 122 can be incremental or continuous. For example, the support 122 can be moved relative to the platform 102 between sequential dispensing operations, between sequential curing operations, or both. Alternatively, the support 122 can be moved continuously while the feed material 106 is dispensed and is cured.

In some implementations, an actuator system 118 is operable to lower the platform 102 after each of the layers of feed material 106 is dispensed. The controller 116 operates the actuator system 118 to lower the platform 102 by an amount equal to the height of a layer of the feed material 106. Consequently, the apparatus 100 can maintain a constant height offset between the top surface of the feed material 106 and the printhead system 104 from layer-to-layer.

Figure 5:
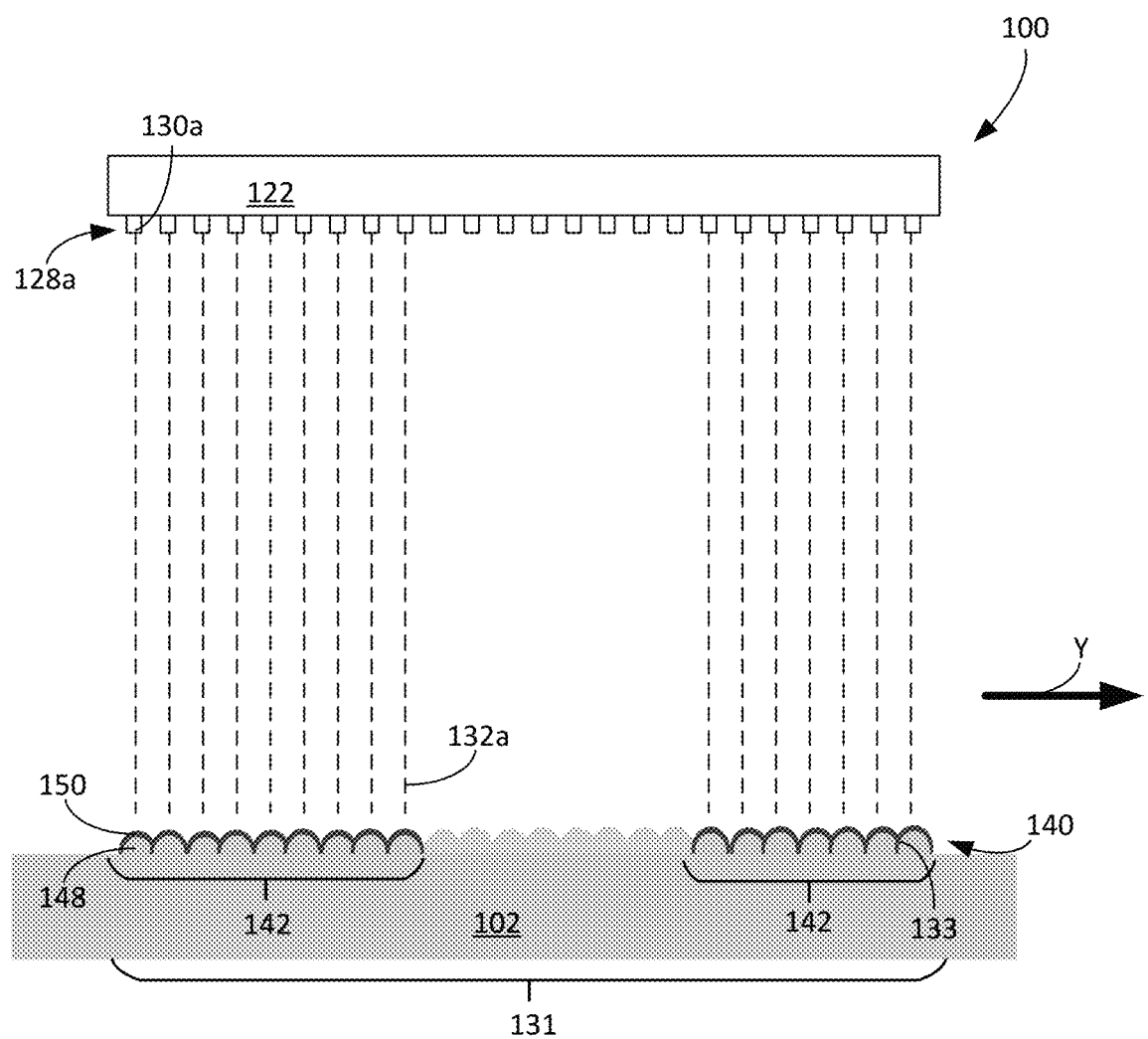
FIG. 5 is a schematic front view of an example of an additive manufacturing apparatus in which a first array of energy sources is operated to emit radiation toward a platform.

The energy sources 130a are operable to emit radiation beams 132a toward the platform 102 to cure dispensed feed material 106 on the platform 102. In some implementations, the energy sources 130a are arranged such that each radiation beam 132a is directed toward a different voxel of feed material of a topmost layer of the dispensed feed material 106. Referring to FIG. 5, the energy sources 130a are positioned such that each energy source cures a corresponding voxel of the article to be formed. Each voxel of the article to be formed can correspond to one or more drops 133 of feed material 106. Such an arrangement of the energy sources 130a enables the energy sources 130a to be selectively operated to selectively cure multiple drops 133 of the feed material 106 extending along the Y-axis at once without requiring relative motion between the array 128a and the platform 102 along the Y-axis.

The decoupling of the materials dispensing with traversing gantry motion and curing can avoid asymmetric shape formation of cured materials on each layer. A time delay between deposition and exposure can be timed to allow droplets to 'reshape' to semi-spherical morphology before curing energy is applied.

Between sequential operations of the energy sources 130a, the energy sources 130a are repositioned to cure a different set of voxels. For example, the energy sources 130a can be operated to cure a first set of drops 133, and then can be repositioned to cure a second set of voxels offset from the first set of drops 133 along the X-axis. As described herein, the energy sources 130a can be moved relative to the platform 102 along the X-axis and, in some implementations, along the Y-axis. In this regard, the second set of voxels alternatively can be offset from the first set of drops 133 along the Y-axis.

The array 128a of the energy sources 130a extends along the Y-axis, e.g., in a direction perpendicular to the direction of relative motion of the platform 102 and the support 122. In some implementation, the array 128a of the energy sources 130a is a linear array, e.g., it extend only along the Y-axis.

In some implementations, referring to FIGS. 2 and 5, the array 128a of the energy sources 130a extends across an entire width of a usable build area 131 on the platform 102. The support 122 is scanned along the X-axis so that the energy sources 130a can selectively cure the feed material 106 across the entire usable build area 131 of the platform 102.

In some implementations, the energy sources 130a are mounted on and movable with the support 122 as the support 122 is moved along a horizontal plane above the platform 102. For example, the energy sources 130a can be fixed to the support 122. In this regard, the printhead system 104 and the array 128a of energy sources 130a are movable relative to the platform 102 together when the linear actuator 124a is operated to drive the support 122.

Alternatively, in some cases, the energy sources 130a are mounted to a support separate from the support 122. For example, the energy sources 130a can be mounted on a wall of the apparatus 100 and remain fixed as the support 122 is moved. If the energy sources 130a are supported on the support 122 supporting the printhead system 104, the support 122 is movable along the X-axis to generate the motion of the energy sources 130a in the scanning direction 126. If the energy sources 130a are separately mounted, the actuator system 124 includes an actuator, in addition to the linear actuator 124a, configured to cause the energy sources 130a to scan in the scanning direction 126.

Alternatively, the array 128a of the energy sources 130a extends across a portion of an entire width of the platform 102. If the energy sources 130a do not extend along an entire width of the platform 102, the array 128a of the energy sources 130a are movable along the Y-axis so that the energy sources 130a can be repositioned to cure feed material dispensed along any portion of the entire width of the build area or the platform 102. In some implementations, a linear actuator 124b of the actuator system 124 is positioned on the support 122. The linear actuator 124b is operable to move the array 128a of the energy sources 130a along the Y-axis relative to the support 122 and relative to the platform 102.

During the curing process, the linear actuator 124b is operated to advance the array 128a of the energy sources 130a along the Y-axis a distance equal to a length of the drops 133 of feed material 106 that can be simultaneously cured by the energy sources 130a. For example, if each energy source 130a cures a corresponding drop 133 of feed material 106, the number of drops 133 defining the distance that the array 128a is advanced along the Y-axis is substantially equal to the number of energy sources 130a. In some cases, each energy source 130a cures two or more drop 133. In such examples, the distance that the array 128 is advanced along the Y-axis between sequential emitting operations of the energy sources 130a is equal to the number of drops 133 cured by each energy source 130a times the number of energy sources 130a extending along the Y-axis. The energy sources 130a emit radiation to cure a first set of drops of feed material 106, advance along the Y-axis, emit radiation to cure a second set of drops of feed material 106, and continue these steps until the array 128a of the energy sources scans across an entire width of the build area 131.

In some implementations, the array 128a of the energy sources 130a extends along a direction of motion of the platform 102, e.g., along the X-axis. If each of the energy sources 130a corresponds to a single different voxel, the energy sources 130a are thus capable of curing multiple voxels extending along the X-axis. As a result, a number of increments of relative motion between the support 122 and the platform 102 along the X-axis to cause the energy sources 130a to scan across an entire length of the platform 102 can be decreased.

In some implementations, the array 128a extends along both the X-axis and Y-axis. For example, the array 128a can form a rectangular array in which the energy sources 130a are arranged in parallel rows and columns. Alternatively, adjacent columns of energy sources 130a are staggered relative to one another, or adjacent rows of energy sources 130a are staggered relative to one another.

In some implementations, the array 128a extends along the X-axis and Y-axis such that the array 128a extends across the entire usable build area 131 for the article. During relative motion of the platform 102 and the support 122, the platform 102 is positioned relative to the array 128a such that the build area 131 is beneath the array 128a of energy sources 130a and such that the energy sources 130a can direct radiation toward any portion of the build area 131. The energy sources 130a can then be selectively operated to selectively cure portions of the feed material 106 dispensed in any portion of the build area 131. In such examples, the array 128a can selectively cure the feed material in an entire layer.

Figure 6:
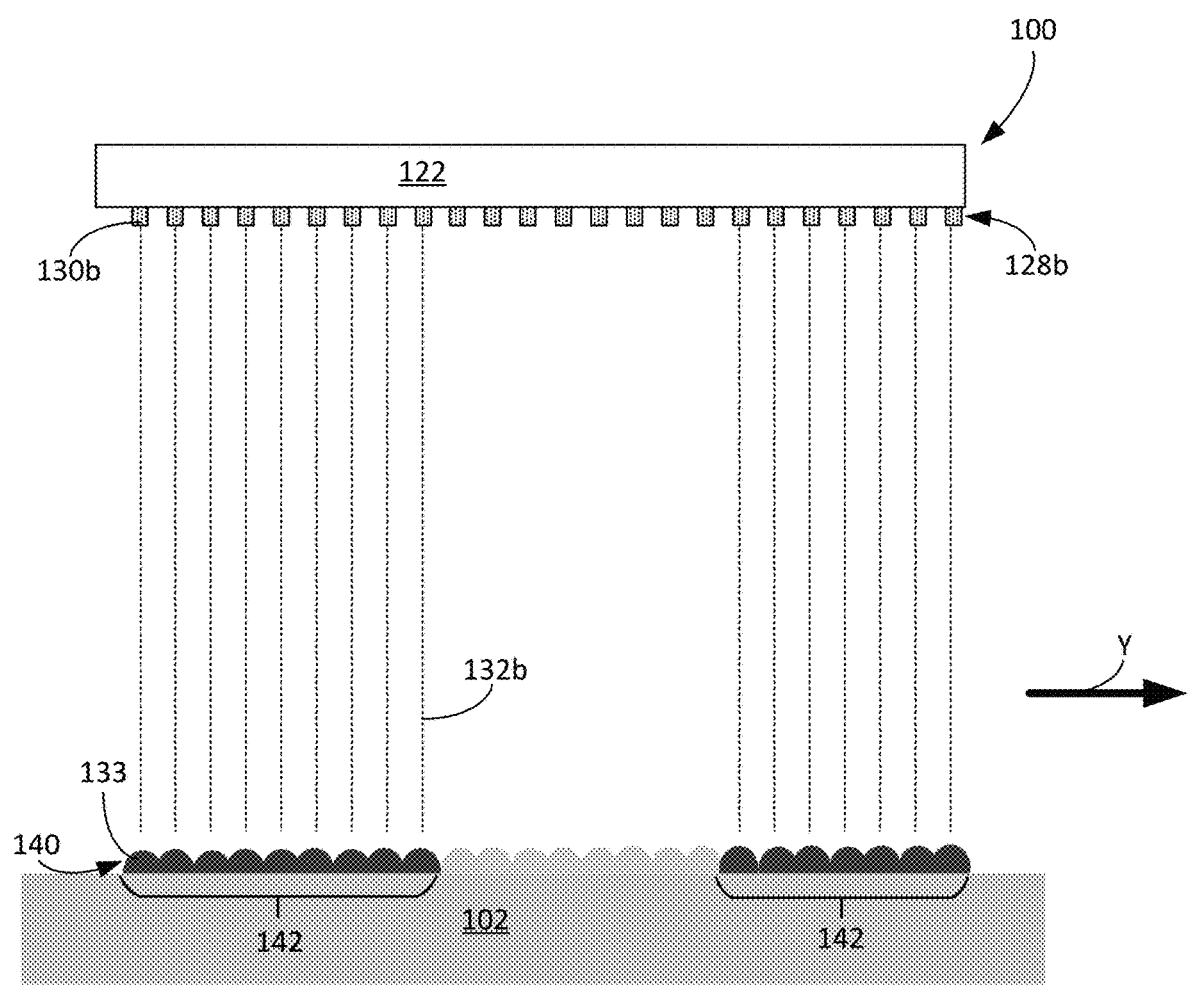
FIG. 6 is a schematic front view of the additive manufacturing apparatus of FIG. 5 in which a second array of energy sources is operated to emit radiation toward the platform.

Referring to FIGS. 2, 5, and 6, in some implementations, the array 128a of the energy sources 130a corresponds to a first array 128a of first energy sources 130a, and the apparatus 100 further includes a second array 128b of second energy sources 130b. The second array 128b can have an arrangement of the second energy sources 130b similar to the arrangement of the first array 128a described herein. During dispensing operations, the controller 116 (shown in FIG. 3) operates the printhead system 104 to dispense, referring to FIG. 5, the drops 133 of feed material 106 on the platform 102.

As shown in FIG. 5, the drops 133 of feed material 106 each includes an exterior surface 148 and an interior volume 150. After operating the printhead system 104 to dispense the drops 133 of feed material 106, the controller 116 operates the energy sources 130a to emit the radiation beams 132a toward the drop 133 of feed material 106 to initiate curing of the exterior surfaces 148 of the drops 133 of feed material 106. This initial curing of the exterior surface 148 can stabilize the drop of feed material 106 corresponding to a drop 133 so as to inhibit motion of the feed material 106.

Referring to FIG. 6, the controller 116 then operates the energy sources 130b to emit the radiation beams 132b toward the drops 133 of feed material 106. The radiation beams 132b cure the interior volumes 150 of the drops 133 of feed material 106. In this regard, the second energy sources 130b differ from the first energy sources 130a in that the first energy sources 130a are operated to cure the exterior surfaces 148 of the drops 133 while the second energy sources 130*b* are operated to cure the interior volumes 150 of the drops 133 of feed material 106. The energy sources 130*b* can emit radiation beams 132*b* to complete the curing process of the drop of feed material 106 by curing the interior volume 150 of the drops 133 of feed material 106.

In some implementations, the radiation beams 132*a* emitted by the first energy sources 130*a* have a wavelength less than a wavelength of the radiation beams 132*b* emitted by the second energy sources 130*b*. The energy sources 130*a*, 130*b* are, for example, ultraviolet (UV) light sources that emit beams of UV light. The UV light can have a wavelength between, for example, 10 nm to 400 nm (e.g., 10 to 320 nm, 320 to 400 nm, 320 nm to 360 nm, 340 nm to 380 nm, 380 nm to 400 nm, 350 nm to 370 nm, approximately 355 nm, approximately 365 nm). The wavelength of the radiation beam 132*a* is, for example, a shorter UV wavelength between 250 nm and 365 nm, while the wavelength of the radiation beam 132*b* is a longer UV wavelength between 365 nm and 450 nm. The high energy of the short UV wavelength of the radiation beam 132*a* enables it to quickly cure the exterior surface 148 of the drop 133 of feed material to stabilize the feed material 106. In contrast, the lower energy of the longer UV wavelength of the radiation beam 132*b* enables it to more uniformly cure the interior volume 150 of the drop 133 of feed material.

In some implementations, the controller 116 operates the energy sources 130*a*, 130*b* such that the drops 133 of feed material 106 are simultaneously exposed to both of the radiation beams 132*a*, 132*b*. The energy sources 130*a*, 130*b* are, for example, positioned relative to one another on the support 122 such that the energy sources 130*a*, 130*b*, when simultaneously activated, simultaneously expose the dispensed drops 133 of feed material 106 to both the radiation beams 132*a*, 132*b*.

If the printhead system 104 is movable across the platform 102, e.g., the printhead system 104 is mounted on the horizontally movable support 122, the energy sources 130*a*, 130*b* are both positioned behind the printhead system 104 in the scanning direction 126. In this regard, during a manufacturing operation, the controller 116 operates the printhead system 104 to dispense feed material. The controller 116 then operates the actuator system 124 to scan the support 122 holding the printhead system 104 and the energy sources 130*a*, 130*b* by an increment in the scanning direction 126. The increment is sufficiently large to reposition the energy sources 130*a*, 130*b* above the feed material dispensed by the printhead system 104. In this regard, the energy sources 130*a*, 130*b* are positioned such that, when they are activated, the dispensed feed material is exposed to both of the emitted radiation beams 132*a*, 132*b*.

In some implementations, the drops 133 of feed material 106 are exposed to the radiation beams 132*a*, 132*b* sequentially. The energy source 130*b* is, for example, positioned behind the energy source 130*a* along the scanning direction (i.e., the X-axis). The energy sources 130*a*, 130*b* can be positioned relative to one another such that the drops 133 of feed material 106 are exposed to only one of the radiation beams 132*a*, 132*b* at a time. In this regard, the energy sources 130*a*, 130*b* may be simultaneously activated to expose different drops of feed material and/or different voxels to radiation. The drops 133 of feed material 106, in some cases, are exposed to the radiation beam 132*a* first such that the drops 133 of feed material 106 are stabilized and then are exposed to the radiation beam 132*b* to complete the curing process of the interior volume 150.

Figure 7:
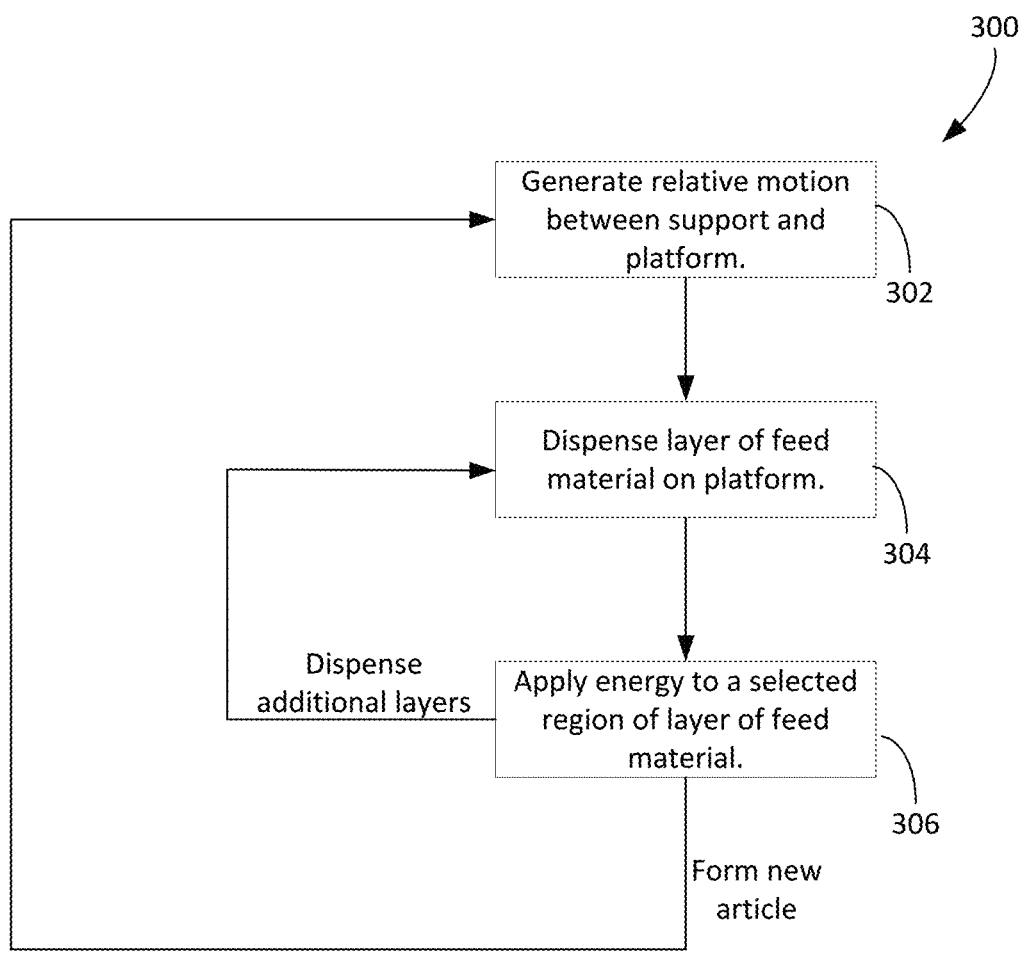
FIG. 7 is a flow chart of a process to form one or more articles.

FIG. 7 illustrates an example process 300 to form an article, e.g., a polishing pad. For example, the apparatus 100, including the controller 116, can execute operations of the process 300.

At an operation 302, relative motion between the support 122 and the platform 102 is generated. For example, one or more linear actuators, e.g., of the actuator system 124, can be operated by the controller 116 to generate the relative motion. The relative motion is controlled so that the printhead system 104 can be repositioned to a target location where feed material 106 is to be dispensed and so that the array 128*a* of the energy sources 130*a* can be repositioned to a target location where the feed material 106 is to be cured.

At operation 304, referring also to FIG. 5, a layer 140 of feed material 106 is dispensed on the platform 102. For example, the printhead system 104 can be operated by the controller 116 to dispense the feed material 106. If the printhead system 104 does not extend across an entire width of the build area 131 and is movable relative to the support 122, in some implementations, at operation 304, the printhead system 104 scans along the Y-axis to dispense feed material 106 along the entire width of the build area 131.

At operation 306, as shown in FIG. 5, energy is applied to one or more selected regions 142 of the layer 140 of feed material 106. For example, the energy can be applied by the energy sources 130*a*. The controller 116 is configured to individually address each of the energy sources 130*a* such that the energy sources 130*a* can be selectively operated to apply energy to the selected regions 142.

If the array 128*a* extends across an entirety of the build area 131, e.g., an entire width and an entire length of the build area 131, the selective curing of the layer 140 is complete after the operation 306, and a subsequent layer can be dispensed on top of the layer 140. Operations 304 and 306 can be repeated until the required number of layers to form the article are dispensed and selectively cured. When the article is fabricated, the process 300 can be repeated to form a new article. For example, at operation 302, the relative motion between the support 122 and the platform 102 is generated to advance the support 122 relative to the platform 102*a* to another build area, e.g., of the platform 102*b*, for the new article to be fabricated. Operations 304 and 306 are then performed (repeatedly, if necessary) to dispense and selectively cure the feed material 106 to form the new article on the platform 102*b*.

In some implementations, prior to application of the energy to the selected region 142, further relative motion between the support 122 and the platform 102 is generated. For example, the printhead system 104 can be positioned relative to the array 128*a* of energy sources 130*a* such that the array 128*a* is positioned to direct radiation toward a set of drops of feed material 106 offset from the drops of feed material dispensed at operation 304. Further relative motion between the support 122 and the platform 102 enables the array 128*a* to direct radiation toward the most recently dispensed feed material 106.

In some implementations, rather than an entire layer being dispensed on the platform 102 at operation 304, a portion of the layer 140 is dispensed. For example, a line of feed material 106 can be dispensed on the platform 102, and then the energy sources 130*a* can apply energy to the line of feed material 106 dispensed. While operation 304 is being performed to dispense the layer 140 of feed material 106 on the platform 102, operation 306 is being performed to apply the energy to selected portions of dispensed feed material. Between sequential dispensing operations, the platform 102 and the support 122 are moved relative to one another to enable the feed material 106 to be dispensed at a new location on the platform 102 and to enable the energy to be applied to a new selected portion of the dispensed feed material 106. The platform 102 and the support 122 are incrementally moved relative to one another such that the feed material 106 is dispensed and the feed material 106 is cured when the motion has stopped. The selected portions, when combined, form the selected regions 142 of cured feed material.

Alternatively, rather than being moved relative to one another between sequential dispensing operations, the platform 102 and the support 122 are moved relative to one another continuously during the dispensing of feed material 106 and applying of energy in operations 304 and 306. The feed material 106 is dispensed and the energy is applied while the platform 102 and the support 122 are continuously in motion to advance the platform 102 relative to the support 122.

Alternatively, the array 128a can be positioned such that no further movement is required to cure the feed material 106 dispensed at operation 304. The printhead system 104 can be moved about the platform 102 to dispense the feed material 106, and the energy sources 130a cure the feed material 106 after an entire layer is dispensed.

In some implementations, the energy applied to the selected region 142 includes energy in the form of first radiation beams emitted by the first energy sources 130a and energy in the form of second radiation beams emitted by the second energy sources 130b.

In some implementations, the controller 116 is configured to control an intensity of radiation emitted by the energy sources 130a. Rather than selectively controlling activation of deactivation of the energy sources 130a, the controller 116 modulates the intensity of emitted radiation such that the amount of the energy imparted to the drops 133 of feed material 106 can be precisely controlled. For example, the amount of the energy to be imparted to the feed material 106 to cure the feed material can depend on the type of feed material 106 being dispensed.

In some implementations, the controller 116 determines an amount of current to be delivered to the energy sources 130a and/or the energy sources 130b to control the intensity of the radiation emitted by the energy sources 130a and/or the energy sources 130b. The amount of current can be proportional the intensity of the radiation. The energy sources can include, for example, light emitting diodes (LEDs), configured to emit radiation having an intensity dependent on a current delivered to the LEDs. The energy sources can also include, for example, an array of lasers, e.g., laser diodes.

In some implementations, the controller 116 controls the intensity of the radiation using feedback control. The controller 116 receives a signal indicative of the intensity of the radiation being delivered and implements a feedback control process to ensure that the intensity is within a predefined desired range. The signal is generated by, for example, a photodetector positioned along a path of the radiation beam. In some cases, each of the energy sources 130a emits radiation received by a corresponding photodetector such that the radiation emitted by each of the energy sources 130a can be precisely controlled.

Figure 8:
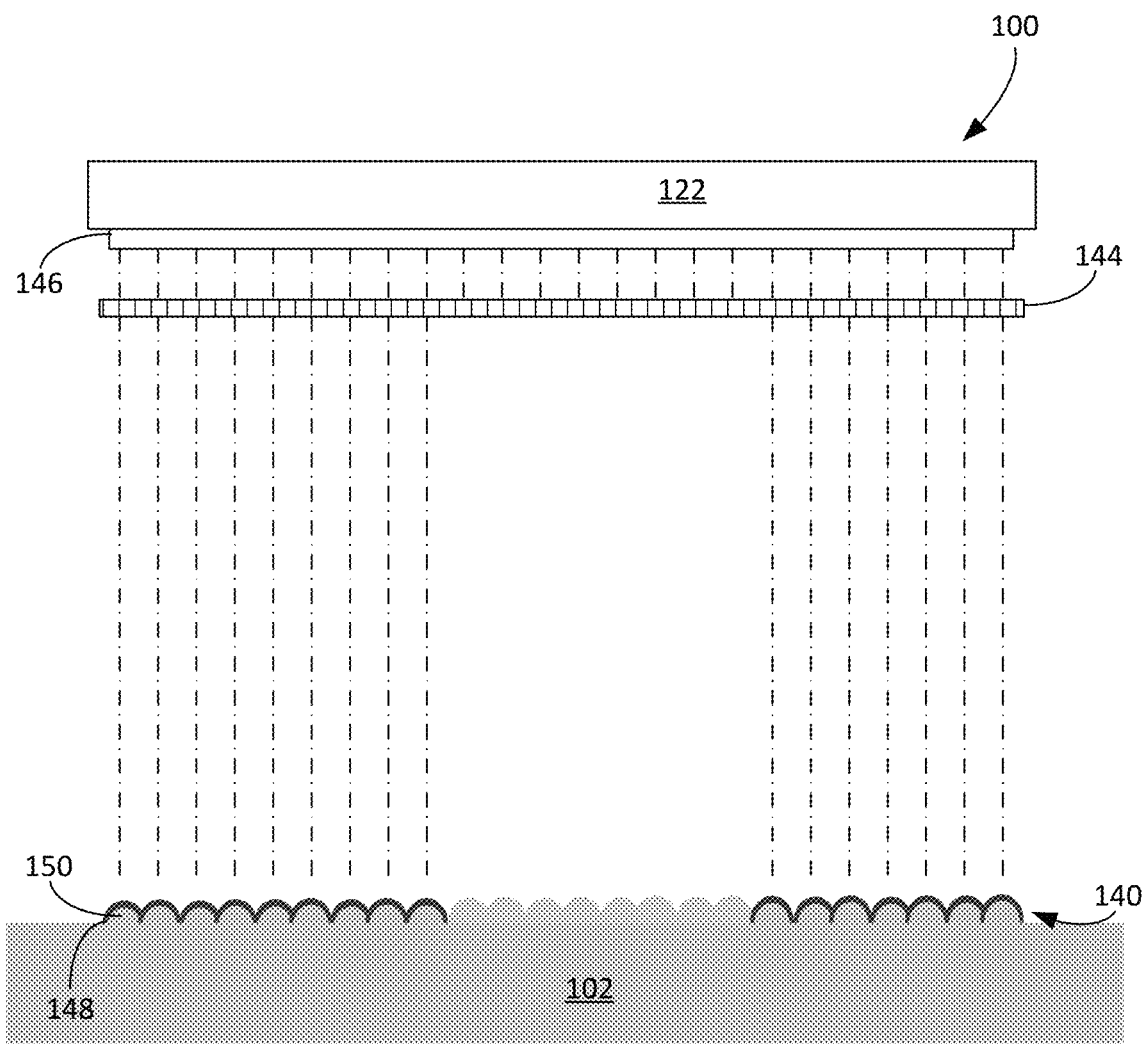
FIG. 8 is a schematic front view of another example of an additive manufacturing apparatus in which an array of energy sources is operated to emit radiation toward a platform.

Referring to FIG. 8, in some implementations, rather than selectively operating the energy sources 130a, 130b, all of the energy sources 130a, 130b are operated to emit radiation, and portions of the radiation are blocked so that only the selected region 142 is cured. In some cases, a bulk energy source 146 is operated to generate radiation directed toward the platform 102. The bulk energy source 146 can include, for example, a lamp or LED array. The apparatus 100 includes a selectively addressable mask 144 to block the radiation from the energy sources 130a, 130b or to block the radiation from the bulk energy source 146. The mask 144 is selectively controlled so that an image corresponding to the selected region 142 is projected through the mask. The controller 116 operates the mask 144 in a manner to allow the radiation to pass through some portions of the mask 144 and to prevent the radiation from passing through other portions of the mask 144, thereby causing the selected region 142 of the layer 140 of feed material 106 to be cured. The bulk energy source 146 can be a first bulk energy source configured to emit radiation to cure the exterior surfaces 148 of the drops 133 of feed material 106, and a second bulk energy source is configured to emit radiation to cure the interior volumes 150 of the drops 133 of feed material 106.

The polishing pad 110 is formed from a predetermined number of layers of feed material being dispensed and cured. In an example of a polishing pad 110 depicted in FIG. 3B, the polishing pad 110 is a multi-layer pad. The polishing pad 110, for example, includes a polishing layer 156 and a backing layer 158. The polishing layer 156 is formed of a material that is, for instance, inert when the polishing pad 110 is used to polish a substrate. The material of the polishing layer 156 can be a plastic, e.g., a polyurethane. In some implementations, the polishing layer 156 is a relative durable and hard material. The polishing layer 156 has a hardness of, for example, about 40 to 80, e.g., 50 to 65, on the Shore D scale.

In some implementations, the polishing layer 156 is layer of homogeneous composition. The polishing layer 156 can include pores 157 suspended in a matrix 159 of plastic material, e.g., polyurethane. The pores 157 can be provided by hollow micro-spheres suspended in the matrix 159, or by voids in the matrix 159 itself.

In some implementations the polishing layer 156 includes abrasive particles held in the matrix 159 of plastic material, e.g., within the pores 157. The abrasive particles are harder than the material of the matrix 159. The material of the abrasive particles can be a metal oxide, such as ceria, alumina, silica or a combination thereof.

In some implementations, the polishing layer 156 has a thickness D1 of 80 mils or less, e.g., 50 mils or less, e.g., 25 mils or less. Because the conditioning process tends to wear away the cover layer, the thickness of the polishing layer 156 can be selected to provide the polishing pad 110 with a useful lifetime, e.g., 1000 polishing and conditioning cycles.

In some implementations, the polishing layer 156 includes grooves 160 for carrying slurry. The grooves 160 form a pattern, such as, for example, concentric circles, straight lines, a cross-hatched, spirals, and the like. If grooves are present, the plateaus between the grooves 160 are, for example, approximately 25-90% of the total horizontal surface area of the polishing pad 110. The grooves 160 occupy, for example, approximately 10%-75% of the total horizontal surface area of the polishing pad 110. The plateaus between the grooves 160 can have a lateral width of about 0.1 to 2.5 mm.

In some implementations, e.g., if there is a backing layer 158, the grooves 160 extend entirely through the polishing layer 156. In some implementations, the grooves 160 extend through about 20-80%, e.g., 40%, of the thickness of the polishing layer 156. The depth of the grooves 160 is, for example, 0.25 to 1 mm. In some cases, for example, in a polishing pad 110 having a polishing layer 156 that is 50 mils thick, the grooves 160 have a depth D2 of about 20 mils.

In some implementations, the backing layer 158 are softer and more compressible than the polishing layer 156. The backing layer 158 has, for instance, a hardness of 80 or less on the Shore A scale, e.g., a hardness of about have a hardness of 60 Shore A. The backing layer 158, in some cases, is thicker or thinner or the same thickness as the polishing layer 156.

The polishing pad 110 can be used to polish one or more substrates at a polishing apparatus. A description of a suitable polishing apparatus can be found in U.S. Pat. No. 5,738,574. In some implementations, referring to FIG. 4A, a polishing system 200 includes a rotatable platen 204 on which the polishing pad 110 is placed. During a polishing operation, a polishing liquid 206, e.g., an abrasive slurry, is dispensed on the surface of the polishing pad 110 by a polishing liquid supply port, which can be combined with a rinse arm 208. The polishing liquid 206, in some cases, contains abrasive particles, a pH adjuster, or chemically active components.

In some implementations, to polish a substrate 210, the substrate 210 is held against the polishing pad 110 by a carrier head 212. The carrier head 212 is suspended from a support structure, such as a carousel, and is connected by a carrier drive shaft 214 to a carrier head rotation motor so that the carrier head can rotate about an axis 216. The relative motion of the polishing pad 110 and the substrate 210 in the presence of the polishing liquid 206 results in polishing of the substrate 210.

The controller, e.g., the controller 116, can be implemented in digital electronic circuitry, or in computer software, firmware, or hardware, or in combinations of them. The controller can include one or more computer program products, i.e., one or more computer programs tangibly embodied in an information carrier, e.g., in a non-transitory machine readable storage medium or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The controller 116 and other computing devices part of systems described can include non-transitory computer readable medium to store a data object, e.g., a computer aided design (CAD)-compatible file that identifies the pattern in which the feed material should be formed for each layer. For example, the data object could be a STL-formatted file, a 3D Manufacturing Format (3MF) file, or an Additive Manufacturing File Format (AMF) file. In addition, the data object could be other formats such as multiple files or a file with multiple layer in tiff, jpeg, or bitmap format. For example, the controller could receive the data object from a remote computer. A processor in the controller 116, e.g., as controlled by firmware or software, can interpret the data object received from the computer to generate the set of signals necessary to control the components of the apparatus 100 to deposit and/or cure each layer in the desired pattern.

A number of implementations have been described. Nevertheless, it will be understood that various modifications may be made.

Thickness of each layer of the layers of feed material and size of each of the voxels may vary from implementation to implementation. In some implementations, when dispensed on the platform 102, each voxel can have a width of, for example, 10 µm to 50 µm (e.g., 10 µm to 30 µm, 20 µm to 40 µm, 30 µm to 50 µm, approximately 20 µm, approximately 30 µm, or approximately 50 µm). Each layer can have a predetermined thickness. The thickness can be, for example, 0.10 µm to 125 µm (e.g., 0.1 µm to 1 µm, 1 µm to 10 µm, 10 µm to 20 µm, 10 µm to 40 µm, 40 µm to 80 µm, 80 µm to 125 µm, approximately 15 µm, approximately 25 µm, approximately 60 µm, or approximately 100 µm).

In some examples, the additive manufacturing apparatus 100 includes 1, 2, or 3 printheads have been described. Alternatively, the apparatus 100 includes four or more printheads. Each of the printheads is, for example, mounted onto the support 122. The printheads are thus movable as a unit across the platform 102. In some cases, the apparatus 100 includes 8 or more printheads, e.g., 8 printheads, 12 printheads, etc. that are aligned along the scanning direction 126. In one example, 4 of the printheads dispense a first feed material, e.g., feed material A, 2 of the printheads dispense a second feed material, e.g., feed material B, and 2 of the printheads dispense a third feed material, e.g., feed material C.

While columns of the energy sources 130a are shown as alternating with columns of the energy sources 130b, in some implementations, the array 128a and the array 130a do not overlap. The array 128a of the energy sources 130a is positioned between the printhead system 104 and the array 130a. In this regard, the printhead system 104 dispenses the feed material 106, relative motion between the support 122 and the platform 102 is generated, and the energy sources 130a then cure the outer surfaces 148 of the feed material 106. Further relative motion between the support 122 and the platform 102 is generated, and then the energy sources 130b cure the interior volumes 150 of the feed material 106.

Figure 9:
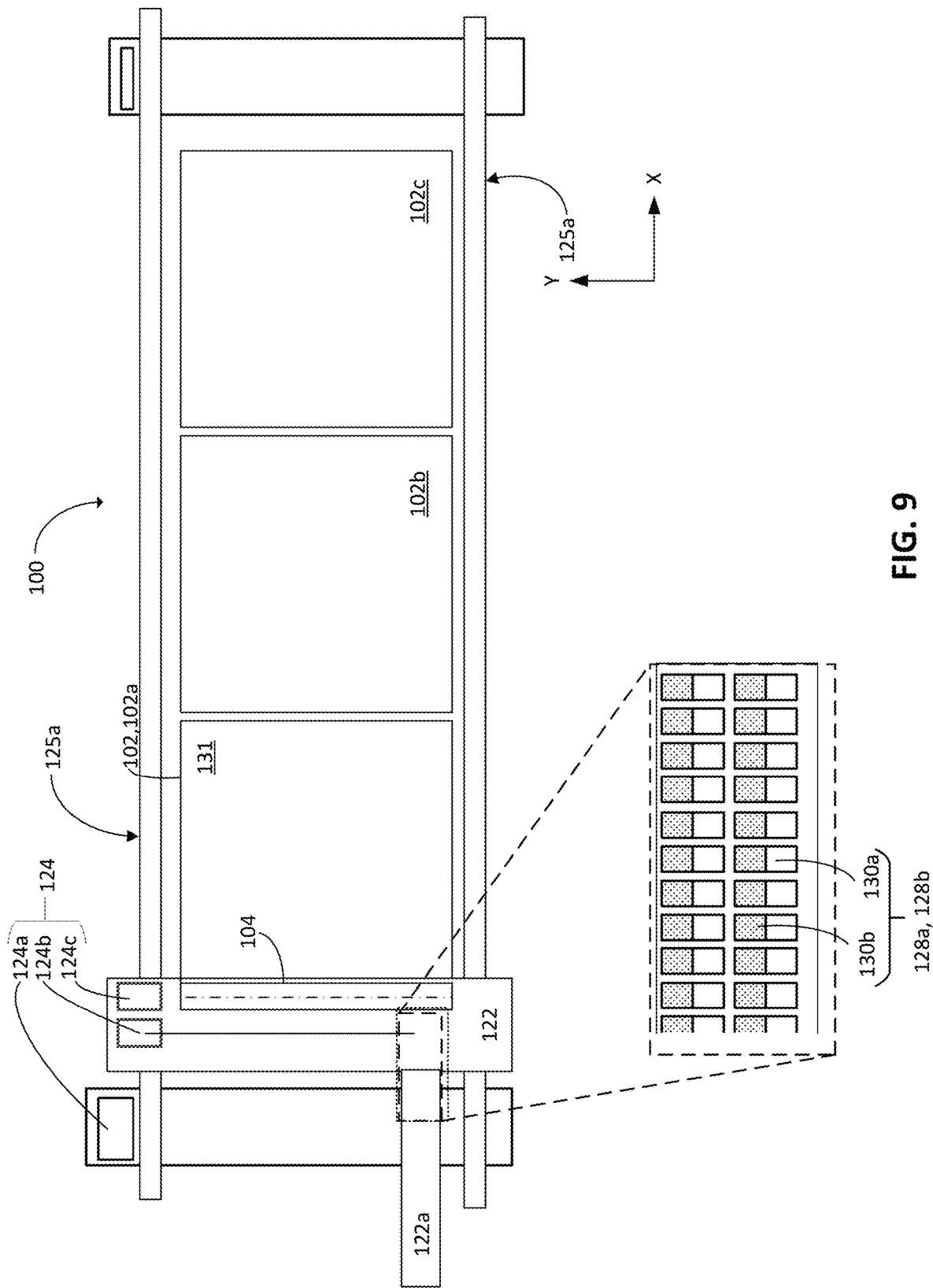
FIG. 9 is a schematic top view of another example of an additive manufacturing apparatus.

Although FIG. 2 illustrates the array 128 of energy sources 130 extending along the Y-axis and spanning the width of the usable build area, as shown in FIG. 9 it would also be possible for the array of energy sources to extend along the X-axis, i.e., parallel to the direction along which the platforms 102 are arranged. In this case, the array 128 of energy sources can span the length (along the X-axis) of the usable build platform or region where the object is to be fabricated. In addition, the array 128 of energy sources 130 can be positioned on a sub-support 122a that is mounted on the support 122, e.g., below the support 122. The sub-support 122a can be configured to move along the Y-axis, e.g., by the actuator 124c, so as to scan the energy sources along the Y-axis direction. In this case, after each layer of deposition, array 128 of energy sources 130 will move in the Y-axis direction (front to back or back to front) to selectively cure the deposited layer.

Figure 10:
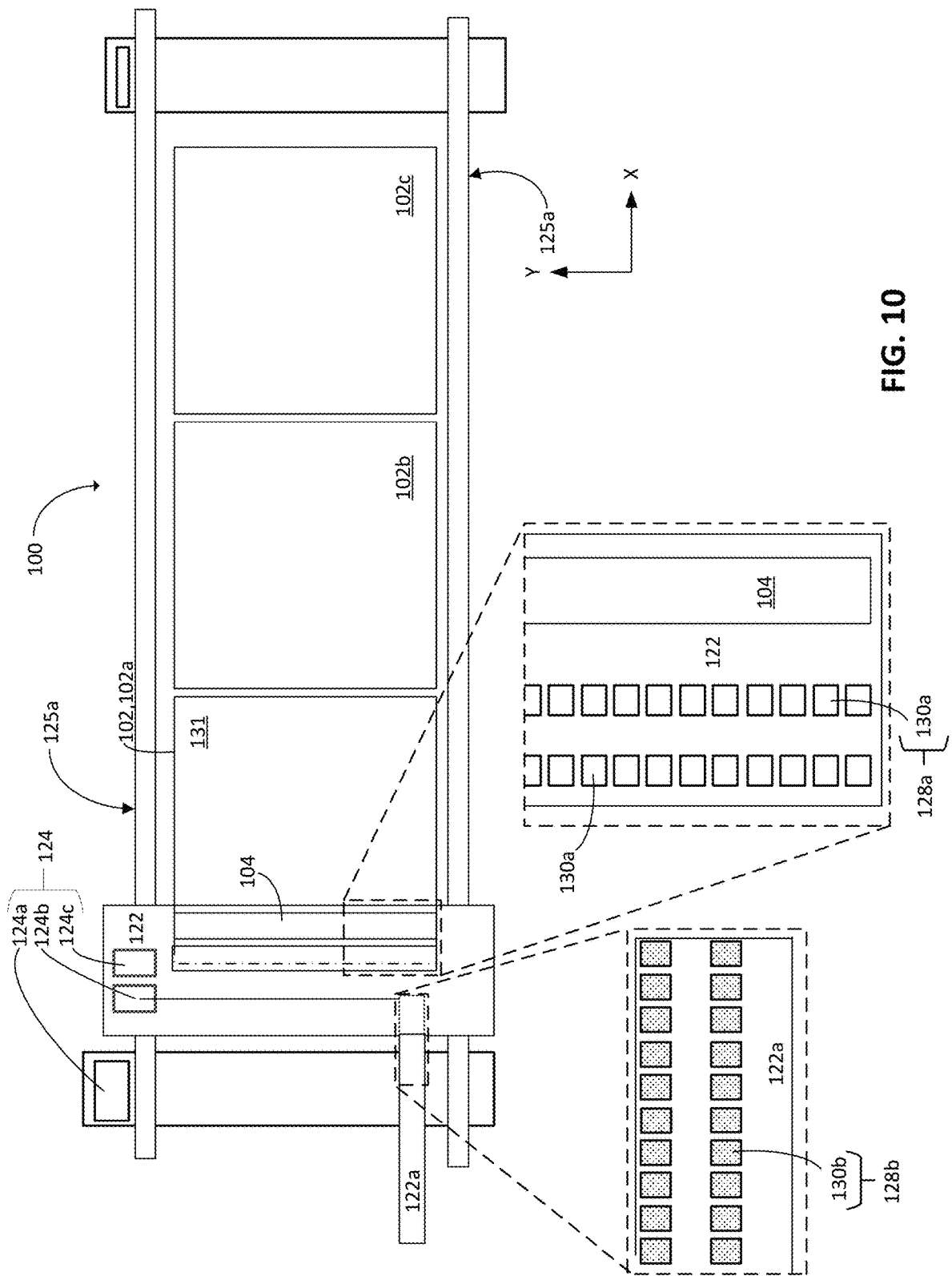
FIG. 10 is a schematic top view of another example of an additive manufacturing apparatus.

In addition, although FIG. 2 illustrates the second array 128b of second energy sources 130b as secured to the support 122 and in a fixed position relative to the first array 128a (e.g., moving with the first array 128a as the support moves), this is not necessary. For example, as shown in FIG. 10, the first array 128a can extend along the Y-axis (and be moved by the gantry along the Y-axis). The second array 128b can extend along the X-axis (and be moved along the Y-axis on the sub-support 122a). Alternatively, the second array 128b could be on a separate support from the gantry 122. Again, the second array 128b could extend along the X-axis (and be moved along the Y-axis on by the separate support 122).

Figure 11:
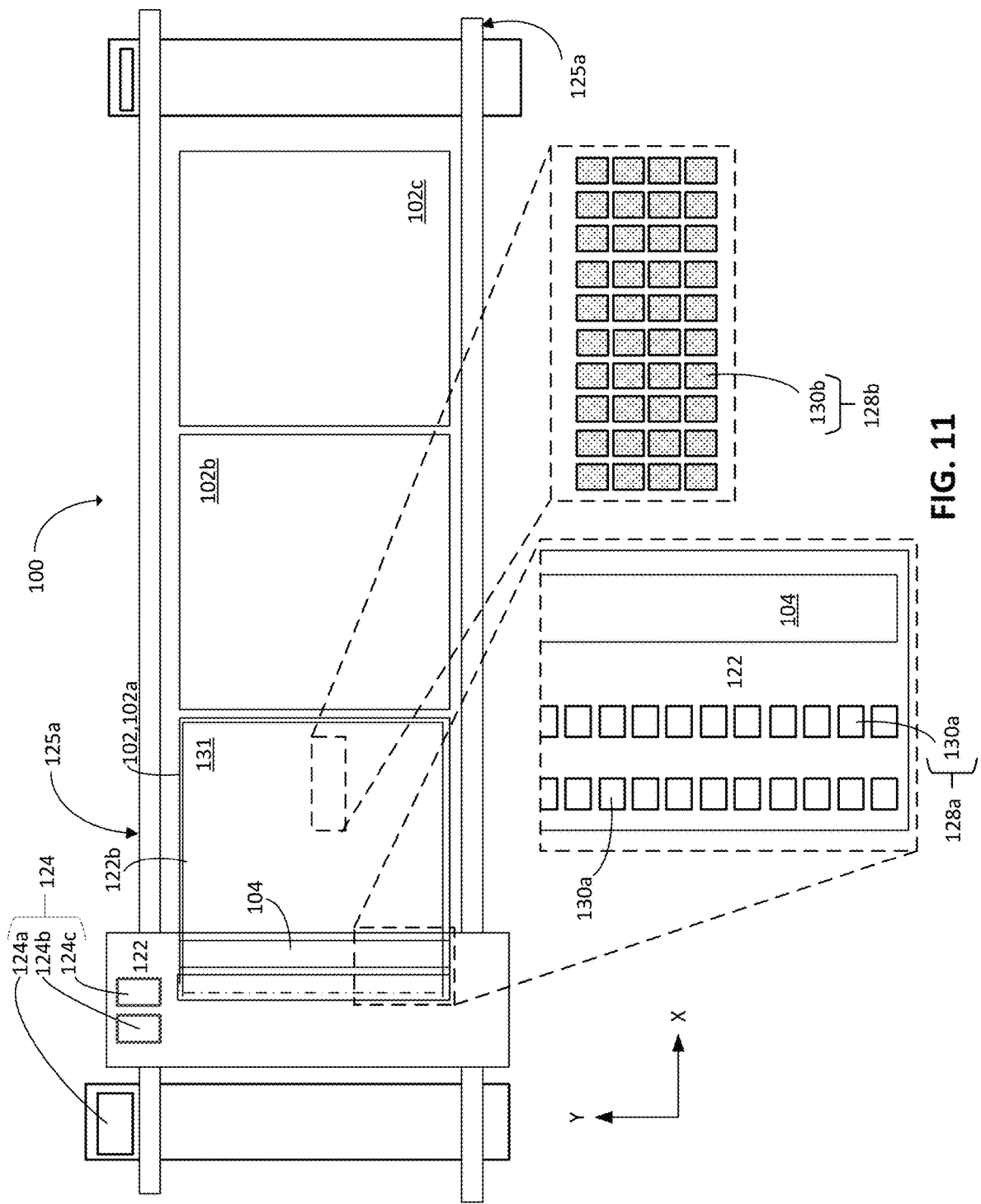
FIG. 11 is a schematic top view of another example of an additive manufacturing apparatus.

Referring to FIG. 11, As yet another alternative, the second array 128b is a 2-dimensional array that spans the entire usable width and length of the platform, but is immobile relative to the platform. The second array 128b can be held on a support 122b positioned above the location where the support 122 will scan.

In these various implementations, the shorter wavelength energy source can ride with printhead array, e.g., on the support 122, whereas the longer wavelength source can span the entire platform or rides along the Y-axis direction. This permits the shorter wavelength energy source to be in close proximity and/or driven with the dispenser such that deposited droplets can be fixed onto the underlying layer or platform to provide a controlled cured morphology surface texture. In contrast, bulk cure can be performed by a different curing source within the system.

Although the apparatus has been described in the context of fabrication of a polishing pad, the apparatus can be adapted for fabrication of other articles by additive manufacturing.

Accordingly, other implementations are within the scope of the claims.

What is claimed is:

1. An additive manufacturing apparatus comprising:
a platform having a top surface;
one or more printheads supported configured to dispense successive layers of feed material;
a first support;
a first actuator coupled to at least one of the platform and the first support and configured to create relative motion therebetween along a first axis such that the first support scans across the platform;
a first plurality of individually addressable first energy sources supported on the first support above the platform, the first energy sources arranged in an array that extends at least along a second axis parallel to the top surface of the platform and perpendicular to the first axis and configured to emit radiation toward the platform; and
a second support that is fixed stationary relative to platform;
a second plurality of individually addressable second energy sources supported on the second support above the platform and configured to emit radiation toward the platform; and
a controller configured to
cause the printheads to dispense a layer of feed material;
cause the first actuator to create relative motion between the first support and the platform such that the first energy sources scan across the platform, and
operate the first and second energy sources to apply energy to a selected region of the layer of feed material on the platform.

2. An additive manufacturing apparatus, comprising:
a platform having a top surface;
one or more printheads supported configured to dispense successive layers of feed material;
a first support;
a first actuator coupled to at least one of the platform and the first support and configured to create relative motion therebetween along a first axis parallel to the top surface such that the first support scans across the platform;
a first plurality of individually addressable first energy sources supported on the first support above the platform, the first energy sources arranged in a first array that extends at least along a second axis parallel to the top surface of the platform and perpendicular to the first axis and configured to emit radiation toward the platform; and
a second support;
a second plurality of individually addressable second energy sources supported on the second support above the platform and configured to emit radiation toward the platform, wherein the second plurality of second energy sources is arranged in a second array that extends at least along the first axis; and
a controller configured to
cause the printheads to dispense a layer of feed material;
cause the first actuator to create relative motion between the first support and the platform such that the first energy sources scan across the platform, and
operate the first and second energy sources to apply energy to a selected region of the layer of feed material on the platform.

3. The additive manufacturing apparatus of claim 2, comprising a second actuator coupled to at least one of the platform and the second support and configured to create relative motion therebetween along a second axis substantially perpendicular to the first axis such that the second support scans across the platform in a direction perpendicular to the first axis.

4. The additive manufacturing apparatus of claim 3, wherein the second support is mounted to a frame separately from the first support.

5. An additive manufacturing apparatus comprising:
a platform having a top surface;
one or more printheads supported configured to dispense successive layers of feed material;
a first support;
a first actuator coupled to at least one of the platform and the first support and configured to create relative motion therebetween along a first axis parallel to the top surface such that the first support scans across the platform;
a first plurality of individually addressable first energy sources supported on the first support above the platform, the first energy sources arranged in a first array that extends at least along a second axis parallel to the top surface of the platform and perpendicular to the first axis and configured to emit radiation toward the platform; and
a second support;
a second actuator coupled to at least one of the platform and the second support and configured to create relative motion therebetween along the first axis such that the second support scans across the platform in a direction parallel to the first axis independently of the first support;

a second plurality of individually addressable second energy sources supported on the second support above the platform and configured to emit radiation toward the platform, wherein the second plurality of second energy sources is arranged in an array that extends at least along the second axis; and a controller configured to
cause the printheads to dispense a layer of feed material;
cause the first actuator to create relative motion between the first support and the platform such that the first energy sources scan across the platform, and
operate the first and second energy sources to apply energy to a selected region of the layer of feed material on the platform.

6. An additive manufacturing apparatus, comprising:
a platform having a top surface;
one or more printheads supported configured to dispense successive layers of feed material;
a first support;
a first actuator coupled to at least one of the platform and the first support and configured to create relative motion therebetween along a first axis parallel to the top surface such that the first support scans across the platform;
a first plurality of individually addressable first energy sources supported on the first support above the platform, the first energy sources arranged in a first array that extends at least along a second axis parallel to the top surface of the platform and perpendicular to the first axis and configured to emit radiation toward the platform; and
a second support, wherein the second support is stationary relative to platform;
a second plurality of individually addressable second energy sources supported on the second support above the platform and configured to emit radiation toward the platform; and
a controller configured to
cause the printheads to dispense a layer of feed material;
cause the first actuator to create relative motion between the first support and the platform such that the first energy sources scan across the platform, and
operate the first and second energy sources to apply energy to a selected region of the layer of feed material on the platform.

7. The additive manufacturing apparatus of claim 6, wherein the second plurality of individually addressable second energy sources is a two-dimensional array extending along both the first axis and the second axis.

8. The additive manufacturing apparatus of claim 7, wherein the two-dimensional array extends along an entire width and length of a build area of the platform.

9. The additive manufacturing apparatus of claim 2, wherein the first energy sources each correspond to a voxel of a topmost layer of feed material above the platform.

10. The additive manufacturing apparatus of claim 9, wherein the first energy sources are configured to emit radiation having a first wavelength, and the second energy sources are configured to emit radiation have a second wavelength, the second wavelength being less than the first wavelength.

11. The additive manufacturing apparatus of claim 9, wherein each of the first and second energy sources include light emitting diodes (LEDs) configured to emit radiation having an intensity dependent on a current delivered to the LEDs.

* * * * *